United States Patent [19]

Yada

[11] Patent Number: 5,748,669
[45] Date of Patent: May 5, 1998

[54] METHOD AND APPARATUS FOR TRANSMITTING INFORMATION CONVERTED TO SPREAD SPECTRUM SIGNAL

[75] Inventor: Katsuhiro Yada, Osaka, Japan

[73] Assignee: Sumitomo Electric Industries, Ltd., Osaka, Japan

[21] Appl. No.: 630,759

[22] Filed: Apr. 10, 1996

[30] Foreign Application Priority Data

Apr. 27, 1995 [JP] Japan ................... 7-104262

[51] Int. Cl.$^6$ .................. H04B 15/00; H04B 7/02; H04L 1/02
[52] U.S. Cl. .................. 375/202; 375/267; 375/299; 455/101
[58] Field of Search ............... 375/200–202, 375/206, 208, 267, 299, 347; 370/342, 320, 335; 455/52.3, 65, 101–269, 272, 275, 276.1, 273

[56] References Cited

U.S. PATENT DOCUMENTS

| | | | |
|---|---|---|---|
| 4,849,990 | 7/1989 | Ikegami et al. | 375/267 |
| 4,856,025 | 8/1989 | Takai | 375/267 |
| 5,046,066 | 9/1991 | Messenger | 370/349 |
| 5,291,516 | 3/1994 | Dixon et al. | 375/200 |
| 5,305,353 | 4/1994 | Weerackody | 375/299 |
| 5,408,496 | 4/1995 | Ritz et al. | 375/202 |
| 5,479,448 | 12/1995 | Seshadri | 375/267 |
| 5,506,863 | 4/1996 | Meidan et al. | 375/202 |
| 5,533,011 | 7/1996 | Dean et al. | 370/342 |
| 5,598,404 | 1/1997 | Hayashi et al. | 370/342 |

Primary Examiner—Stephen Chin
Assistant Examiner—Amanda T. Le
Attorney, Agent, or Firm—Lane, Aitken & McCann

[57] ABSTRACT

Herein disclosed are a method and an apparatus for transmitting information converted to a spread spectrum signal, the information being coded to form an information signal before being converted to the spread spectrum signal. The spread spectrum signal is produced on the basis of the information signal and a spreading modulation code which is a pattern of frequency hopping or a pseudo-random noise code well known as PN code. The spread spectrum signal is provided with a signal propagation character when the spread spectrum signal is transmitted. The signal propagation character of the spread spectrum signal is varied while the spread spectrum signal is transmitted, thereby making it possible to reduce the influence of fading effects without applying a diversity system to a spread spectrum receiver and accordingly have the spread spectrum receiver decreased in size, weight and cost.

30 Claims, 10 Drawing Sheets

FIG.3 (a) ORIGINAL TRANSMITTANCE INFORMATION

FIG.3 (b) DEFICIENT TRANSMITTANCE INFORMATION

FIG.3 (c) TRANSMITTANCE INFORMATION REPRODUCED FROM DEFICIENT TRANSMITTANCE INFORMATION

METHOD AND APPARATUS FOR TRANSMITTING INFORMATION CONVERTED TO SPREAD SPECTRUM SIGNAL

BACKGROUND OF THE INVENTION

1. Field of the Invention

The present invention relates in general to a spread spectrum communication system and more particularly to a method and an apparatus for transmitting information modulated through spread spectrum modulation techniques.

2. Description of the Related Art

There has so far been proposed a spread spectrum communication system (hereinlater referred to as "SS communication system" for brevity) which uses a transmission signal having a broad bandwidth. The transmission signal is produced on the basis of an information signal to be transmitted. The bandwidth of the transmission signal is usually several orders of magnitude greater than that of the information signal. The information signal is spread over a wide allocated frequency spectrum to form a transmitting signal known as a spread spectrum signal. Although the bandwidth of the spread spectrum signal used in the SS communication system is extremely wide for a single user, the SS communication system has advantages in that many users can simultaneously use the same bandwidth without seriously interfering with one another and that the information can be transmitted in secrecy.

There are two types of SS communication system known as a direct sequence SS communication system (hereinafter referred to as "DS-SS communication system" for simplicity) and a frequency hopping SS communication system (hereinafter referred to as "FH-SS communication system" for simplicity), respectively. When the information signal is transmitted by the former DS-SS communication system, the information signal is spread over the wide allocated frequency spectrum by combining the information signal with spread code known as pseudorandom noise code generally called PN code. The PN code has predetermined binary states known as chips. When, on the other hand, the information signal is transmitted by the latter FH-SS communication system, the information signal is hopped over a number of narrow frequency bands into which the wide allocated spectrum is divided. The narrow frequency bands correspond respectively to the aforesaid chips. There is further proposed a hybrid SS communication system constituted by combining the DS-SS communication system and the FH-SS communication system. For instance, the hybrid SS communication system uses a direct sequence modulated signal having a center frequency made to hop periodically in a pseudorandom fashion. Such a hybrid SS communication system makes it possible to produce a spread spectrum signal of extremely wide bandwidth with ease and is superior in multiple access to the individual DS-SS and FH-SS communication systems.

The above mentioned DS-SS, FH-SS and hybrid SS communication systems are disadvantageous in that their communication qualities are reduced owing to so-called multipath fading effect. The multipath fading is caused by interference between two or more versions of propagation waves which arrive at an receiving antenna at slightly different times. Diversity techniques are well known as measurements to reduce the multipath fading effect. The DS-SS, FH-SS and hybrid SS communication systems in general employ such the diversity techniques to enhance the communication qualities. Such the diversity techniques include a space diversity, a polarization diversity, a time diversity and the like.

The space diversity is most popular in the diversity techniques used in wireless communication systems, and includes a selection diversity and a combining diversity. The selection diversity is effected by a receiver which comprises a plurality of antennas. The receiver is designed to select one of the antennas to receive the transmitting signal in its best condition when the transmitting signal is received by the antennas. The combining diversity is also effected by a receiver which comprises a plurality of antenna. In the combining diversity, the transmitting signals from all of the antennas are summed under the condition that the individual signals are co-phased. The combining diversity includes a so-called maximal ratio combining diversity in which the transmitting signals from all of the antennas are weighted according to their individual signal voltage to noise power ratios and then summed. Likewise, the individual signals in the maximal ration combining diversity must be co-phased in a similar manner to that of the aforesaid combining diversity.

A conventional spread spectrum signal receiver operative through the selection diversity is shown in FIG. 14 as comprising first and second receiving antennas A1 and A2, first and second amplifiers 100, 101, first and second envelope detectors 102 and 103, a selection controller 104, an antenna selector 105 and a demodulator 106. The first and second receiving antennas A1 and A2 are spaced apart from each other at a certain distance which is forced to be a quarter of a wave length of a spread spectrum signal to be received by the first and second receiving antennas A1 and A2 because of the fact that the first and second receiving antennas A1 and A2 are required to receive the spread spectrum signal under the influence of fading effects, respectively, which are independent of each other. For facilitating to understand the spread spectrum signal receiver, it is assumed that the spread spectrum signal received by the first receiving antenna A1 is called a first spread spectrum signal and the spread spectrum signal received by the second receiving antenna A2 is called a SS spectrum signal. When the fading effects respectively upon the first and second spread spectrum signals are thus independent of each other, the first and second receiving antennas A1 and A2 are considered to be spatially uncorrelated with each other.

The first and second spread spectrum signals are transmitted to and amplified by the first and second amplifiers 100 and 101, respectively. The amplified first and second spread spectrum signals are transmitted to the first and second envelope detectors 102 and 103 to form a first envelope and a second envelope, respectively. The switching controller 104 receives and compares the first and second envelopes in voltage level to select one of the first and second envelopes which is larger than the other of the first and second envelopes. On the other hand, the amplified first and second spread spectrum signals are also transmitted to the antenna selector 105. The selection controller 104 instructs the antenna selector 105 to select and output one of the amplified first and second spread spectrum signals corresponding to the larger one of the first and second envelopes selected by the selection controller 104. The selected amplified spread spectrum signal is demodulated by and outputted as received information from the demodulator 106. In the spread spectrum signal receiver thus constructed, the demodulator 106 receives the spread spectrum signal under its better receiving condition and, for this reason, the multipath fading effect can be reduced.

A drawback is, however, encountered in a prior-art spread spectrum communication system operative through the selection diversity of the above described nature in that the spread spectrum signal receiver requires many devices such as the envelope detectors 102 and 103, the switching controller 104 and the signal selector 105. This means that it is difficult for the spread spectrum signal receiver to be designed to have its size, weight and cost decreased. Another drawback is encountered in the prior art spread spectrum communication system operative through the space diversity in that the signal selector 105 tends to induce switching noise in the selected spread spectrum signal and, accordingly, the received information outputted from the demodulator 106 is facilitated to deteriorate in quality. When the prior-art SS communication system is operated through the combining diversity in place of the selection diversity, the SS communication system has no drawback resulting from the switching noise but encounters another drawback that the spread spectrum signal receiver requires many devices including phase shift circuits, phase modulation circuits, a summation circuit and other electric circuits. Similarly to the selection diversity, the maximal ration combining diversity is difficult to decrease the spread spectrum signal receiver in size, weight and cost. The drawbacks described hereinbefore are considerably important for a receiver forming a mobile station and particularly for a radio terminal such as a radio ID tag, a wireless IC card, a hand-held walkie-talkie, a mobile telephone for a vehicle, a hand-held radio terminal, a cordless telephone, a paging receiver and a cellular telephone.

In the meantime, Japanese Patent Laid-open Publication No. 4-185130 discloses another diversity system applied to a spread spectrum signal receiver. In order to reduce a multipath fading effect, the spread spectrum signal receiver is equipped with two receiving antennas spatially correlated with each other for receiving spread spectrum signals, respectively, a summation circuit for summing the spread spectrum signals received by the receiving antennas, a delay circuit provided between one of the receiving antennas and the summation circuit for causing the summation circuit to delay in receiving the spread spectrum signal from the one of the receiving antennas for a certain time with respect to the spread spectrum signal received by the other one of the receiving antennas. Since the number of constituent elements of the spread spectrum signal receiver disclosed in the Japanese Patent Laid-open Publication No. 4-185130 is smaller than that of the spread spectrum signal receiver operative through the selection diversity techniques or the combining diversity techniques, the former spread spectrum signal receiver is advantageous in constitution over the latter spread spectrum signal receiver. These prior-art SS communication systems are, however, difficult to decrease the spread spectrum signal receiver in size, simplicity, weight and cost because of the fact that the spread spectrum signal receiver requires not only particular circuits such as envelope detectors but a plurality of antennas.

SUMMARY OF THE INVENTION

It is a primary object of the present invention to reduce the influence of the fading effect without applying a diversity system to a SS receiver and accordingly have the SS receiver decreased in size, weight and cost.

It is another object of the present invention to enable the SS receiver to accurately reproduce a transmittance information.

In accordance with one aspect of the present invention, there is provided a method of transmitting information converted to a spread spectrum signal, the information being coded to form an information signal represented by a sequence of bits before being converted to the spread spectrum signal. The method comprises a step (a) of generating a spreading modulation code, a step (b) of producing the spread spectrum signal on the basis of the information signal and the spreading modulation code, a step (c) of having the spread spectrum signal provided with a signal propagation character and transmitting the spread spectrum signal, and a step (d) of varying the signal propagation character of the spread spectrum signal while the spread spectrum signal is transmitted.

In accordance with another aspect of the present invention, there is provided an apparatus for transmitting information converted to a spread spectrum signal, the information being coded to form an information signal represented by a sequence of bits before being converted to the spread spectrum signal. The apparatus comprises code generating means for generating a spreading modulation code, signal producing means for producing a spread spectrum signal on the basis of the information signal and the spreading modulation code, signal transmitting means for having the spread spectrum signal provided with a signal propagation character and transmitting the spread spectrum signal, and character varying means for varying the signal propagation character of the spread spectrum signal while the spread spectrum signal is transmitted by the signal transmitting means.

In accordance with a further aspect of the present invention, there is provided an apparatus for transmitting information converted to a frequency hopping spread spectrum signal having a plurality of frequency components, the information being coded to form an information signal represented by a sequence of bits before being converted to the frequency hopping spread spectrum signal. The apparatus comprises pattern generating means for generating a patter of frequency hopping, signal producing means for producing the frequency hopping spread spectrum signal on the basis of the information signal and the pattern of frequency hopping, and signal transmitting means for having the frequency hopping spread spectrum signal provided with a signal propagation character and transmitting the frequency hopping spread spectrum signal. The signal transmitting means is operate to vary the signal propagation character of the frequency hopping spread spectrum signal with the frequency component of the frequency hopping spread spectrum signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2(a)–2(e) is a timing diagram showing the fluctuations of signals produced in a base station shown in FIG. 1 and of a selection from a first and second antennas shown in FIG. 1 when the SS communication shown in FIG. 1 is operated through a first frequency hopping spread spectrum techniques;

FIGS. 3(a)–3(c) is a diagram for explaining error correction of a transmittance information signal;

FIGS. 4(a)–4(e) is a timing diagram showing the fluctuations of signals produced in a base station shown in FIG. 1 and of a selection from a first and second antennas shown in FIG. 1 when the SS communication shown in FIG. 1 is operated through a slow frequency hopping spread spectrum techniques;

FIGS. 13(a)–13(e) is a timing diagram showing the fluctuations of signals produced in a base station shown in FIG. 12 and of a selection from a first and second antennas shown in FIG. 12.

DESCRIPTION OF THE PREFERRED EMBODIMENTS

Figure 1:
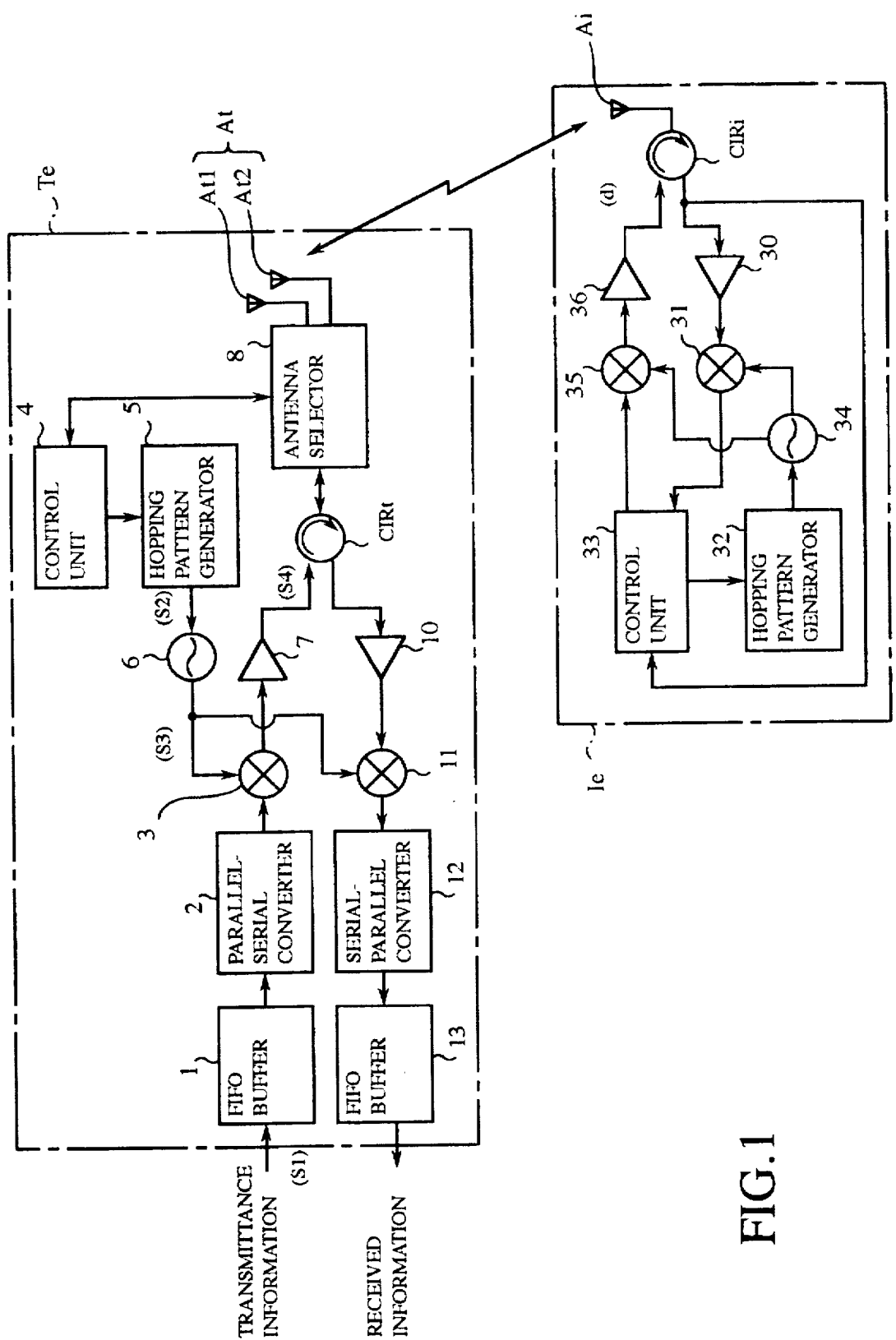
FIG. 1 is a block diagram showing a first embodiment of the SS communication system according to the present invention.
Figure 2:
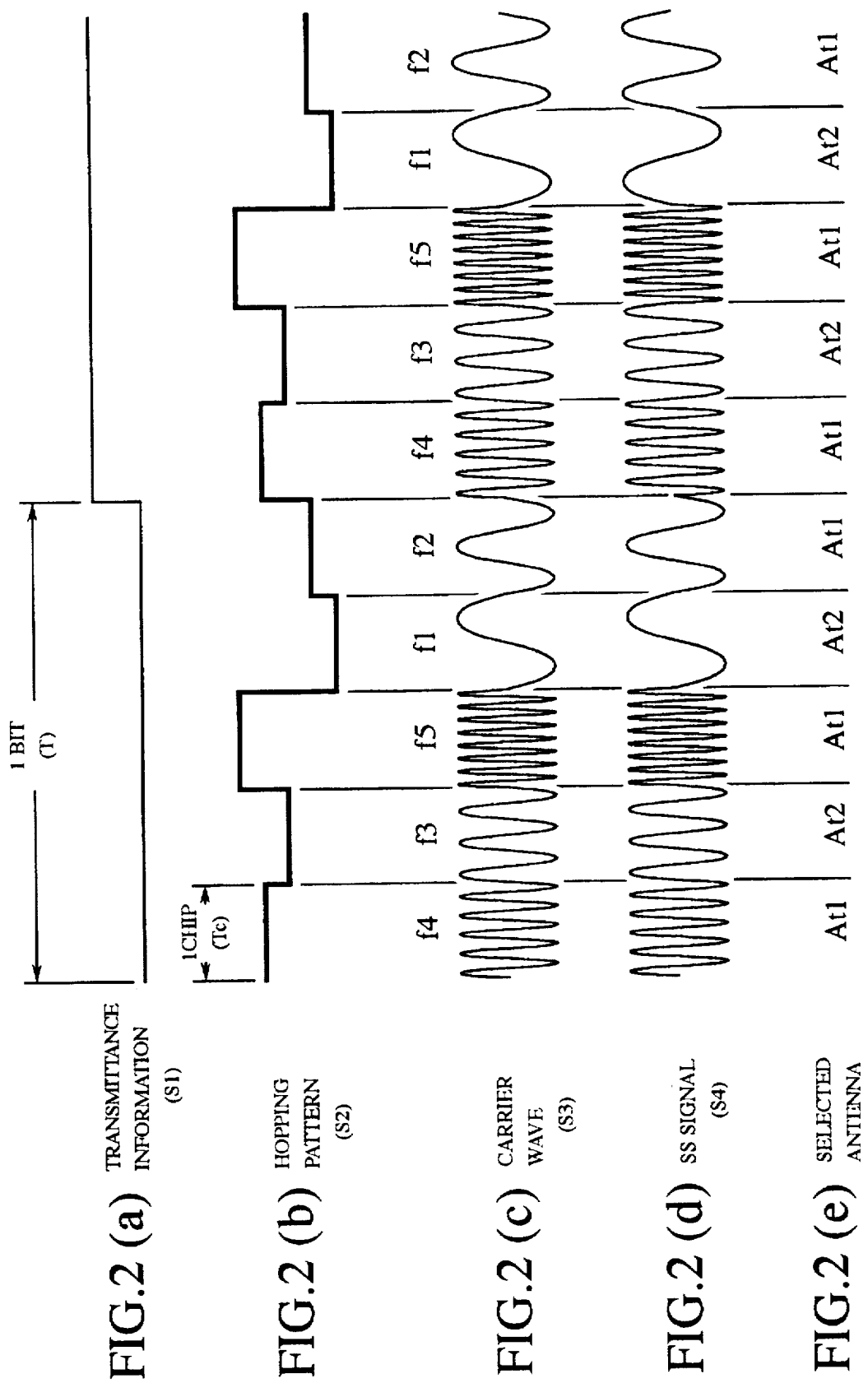
FIG. 2 comprising

Referring to FIGS. 1 to 4 of the drawings, a first preferred embodiment of a spread spectrum communication system according to the present invention will be described hereinafter. The spread spectrum communication system is shown in FIG. 1 as comprising a base station Te fixedly situated in each of radio cell zones collectively forming a coverage area for a wireless communication, and a mobile station Ie including a radio ID tag, a wireless IC card, a hand-held walkie-talkie, a mobile telephone for a vehicle, a hand-held radio terminal, a cordless telephone, a paging receiver and a cellular telephone.

The base station Te comprises a FIFO (First-in-first-out) buffer 1, a parallel-serial converter 2, a spread modulator 3, a control unit 4, a hopping pattern generator 5, a hopping synthesizer 6, a transmitting amplifier 7, an antenna selector 8, a circulator CIRt, a receiving amplifier 10, a despread demodulator 11, a serial-parallel converter 12, a FIFO buffer 13, and a transmitting/receiving antenna unit AT.

The FIFO buffer 1 is designed to receive transmittance information from information supplying means (not shown) and temporarily hold the received transmittance information in order to compensate for a difference in rate of data flow between the base station Te and the transmittance information supplying means. The transmittance information is coded to form a transmittance information signal S1 before being supplied to the FIFO buffer 1. The transmittance information signal is shown in FIG. 2(a) as being represented by a sequence of bits each corresponding to "1" or "0". When the transmittance information signal S1 held by the FIFO buffer 1 is fed to the parallel-serial converter 2, the transmittance information signal S1 is converted from a parallel form to a serial form by the parallel-serial converter 2. The transmittance information signal S1 is fed to the spread modulator 3 by way of a narrow-band modulator (not shown) operative through a digital modulation such as a phase shift keying (PSK) modulation, a frequency shift keying (FSK) modulation, a minimum shift keying (MSK) modulation, an amplitude shift keying (ASK) modulation. The transmittance information signal S1 is combined with a carrier signal such as a sine wave and consequently modulated by the narrow-band modulator. In the PSK modulation, the phase of the carrier signal is switched to take different two values in accordance with the bits of the transmittance information signal S1. In the FSK modulation, the frequency of the carrier signal is switched in accordance with the bits of the transmittance information signal S1. The MSK modulation is a special type of FSK modulation wherein the peak frequency deviation is equal to half the bit rate. In the ASK modulation, the amplitude of the carrier signal is switched between two different values in accordance with the bits of the transmittance information signal S1. Assuming that the transmittance information signal S1 is modulated through the PSK modulation and transmitted to the spread modulation 3, the following description will be made.

The control unit 4 is designed to control the hopping pattern generator 5 and the antenna selector 8. More specifically, the control unit 4 comprises a CPU (Central Processing Unit) for controlling a wide variety of interpretations and executions, a ROM (Read-only Memory) for storing programs and data necessitated to control the base station Te, and a RAM (Random Access Memory) for provisionally storing the programs and data loaded from the ROM and other data produced by the execution of the programs. The control unit 4 thus constructed is operated to execute the programs to give instructions to the hopping pattern generator 5 and the antenna selector 8.

The hopping pattern generator 5 is operated to generate a hopping pattern S2 shown in FIG. 2(b) in response to the instructions from the control unit 4. The hopping pattern S2 is represented by a sequence of chips each having a predetermined duration Tc and having constant signal levels different from one another. In the embodiment, the control unit 4 is constituted to instruct the hopping pattern generator 5 to generate a set of five chips simultaneously when one bit of the transmittance information signal S1 is supplied from the narrow-band modulator to the spread modulator 3 and, as a consequence, the five chips of the hopping pattern S2 exist during the duration of one bit of the transmittance signal S1. The hopping pattern S2 thus generated is transmitted from the hopping pattern generator 5 to the hopping synthesizer 6.

The hopping synthesizer 6 is adapted to produce a carrier wave S3 shown in FIG. 2(c). As will be understood from FIGS. 2(b) and 2(c), the carrier wave S3 is varied in frequency with the signal level of the hopping pattern S2 received from the hopping pattern generator 5. In other words, the carrier wave S3 has five different frequency components defined by frequencies f1 to f5 corresponding to the five signal levels of the hopping pattern S2, respectively. In the present embodiment, f1=2473.6 MHz, f2=2378.8 MHz, f3=2484.0 MHz, f4=2489.2 MHz and f5=2494.4 MHz. The frequencies f4, f3, f5, f1 and f2 are repeatedly produced by said hopping synthesizer 6 in described order during each of one bit duration of the transmittance information signal S1. The carrier wave S3 thus produced is supplied from the hopping synthesizer 6 to the spread modulator 3.

The spread modulator 3 is well known as a mixer and designed to modulate the transmittance information signal S1 through the FH-SS modulation techniques by combining the transmittance information signal S1 with the carrier wave S3 and accordingly produce a spread spectrum signal S4 shown in FIG. 2(d). Since the five chips of the hopping pattern S2 exist during the duration of one bit of the transmittance information signal S1, the spread spectrum signal S4 has five different frequency components identical with the above mentioned frequency components of f1 to f5, respectively. This means that the transmittance information signal S1 is spread by the spread modulator 3 over a wide frequency spectrum and, accordingly, the produced spread spectrum signal has a frequency band width wider than that of the transmittance information signal S1. The spread spectrum signal S4 thus produced is transmitted from the spread modulator 3 to the transmitting amplifier 7.

The transmitting amplifier 7 is adapted to amplify the spread spectrum signal S4 received from the spread modulator 3 to a signal level required by the SS communication system, for example, until the spread spectrum signal has a transmittance power of 10 mW. In addition, the transmitting amplifier 7 includes a bandpass filter for transmitting only the frequency components within a range specified by upper and lower cutoff limits. In this instance, the permissible frequency components corresponds to the frequencies f1 to f5, respectively. The spread spectrum signal S4 thus amplified is fed from the transmitting amplifier 7 to the circulator CIR1.

The circulator CIR1 forms a circuit having three terminals each capable of serving as an input terminal and an output terminal to circularly shift a combination of input and output between the three terminals. When the spread spectrum signal S4 is permitted by the circulator CIRt to be supplied from the transmitting amplifier 7 to the antenna selector 8, the base station Te serves as a transmitter. When a receiving spread spectrum signal described hereinafter is permitted by the circulator CIRt to be supplied from the antenna selector 8 to the receiving amplifier 10, the base station Te serves as a receiver.

The transmitting/receiving antenna unit At comprises first and second antennas At1 and At2 which are, for example, in the type of dipole antenna and spaced apart from each other at a distance which is a quarter of the center wave length of the spread spectrum signal or more. Since the lowest frequency f1 is 2473.6 MHz and the highest frequency f5 is 2494.4 MHz, the distance between the first and second antennas At1 and At2 may be set for instance to 5 cm. When the first and second antennas At1 and At2 are thus spaced apart from each other at the distance corresponding to λ/4 or more, the antennas At1 and At2 are considered to be spatially uncorrelated with each other.

The antenna selector 8 comprises an electrical switch constituted by semiconductor devices such as field effect transistors each abbreviated to FET, or a mechanical switch. The antenna selector 8 is controlled by the control unit 4 to alternatively select one of the antennas At1 and At2 as an antenna from which the spread spectrum signal S4 is emitted, simultaneously when the chip of the hopping pattern is generated by the hopping pattern generator 5. When the first chip of the hopping pattern shown in FIG. 2(b) is generated by the hopping pattern generator 5, the spread spectrum signal is transmitted from the circulator CIR1 to the antenna At1 through the antenna selector 8. When the second chip of the hopping pattern shown in FIG. 2(b) is generated by the hopping pattern generator 5, the spread spectrum signal S4 is transmitted form the circulator CIR1 to the antenna At2 through the antenna selector 8. Likewise, the antenna selections are repeated for the third and the following chips of the spread spectrum signal S4.

On the other hand, the mobile station IE comprises a transmitting/receiving antenna Ai, a circulator CIR1, a receiving amplifier 30, a despread demodulator 31, a hopping pattern generator 32, and a control unit 33, a hopping synthesizer 34, a spread modulator 35 and a transmitting amplifier 36. The antenna Ai is, for example, in the type of a dipole antenna. When the antenna Ai receives the spread spectrum signal from the antenna At of the base station Te, the received spread spectrum signal is supplied to the receiving amplifier 30 though the circulator CIR1. The spread spectrum signal is amplified by the receiving amplifier 30 to a signal level required by the SS communication system. Since the receiving amplifier 30 includes a bandpass filter for transmitting only the frequency components, i.e., f1 to F5, the despread demodulator 31 receives the amplified spread spectrum signal having only the frequencies f1 to f5.

The hopping pattern generator 32 is controlled by the control unit 33 to generate a hopping pattern identical with that generated by the hopping pattern generator 5 of the base station Te. Similarly to the control unit 4 of the base station Te, the control unit 33 comprises a CPU for controlling a wide variety of interpretations and executions, a ROM for storing programs and data required to control the mobile station IE, and a RAM (Random Access Memory) for provisionally storing the programs and data loaded from the ROM, and other data produced by executing the programs. In order to allow the hopping pattern generator 32 to generate the hopping pattern identical with that generated by the hopping generator 5, the control unit 33 carries out an acquisition process operation and a tracking process operation. The acquisition process is taught, for example, by Mitsuhide Yokoyama, "The Spread Spectrum Communication System," Science Technology Publisher. According to the publication, the acquisition process comprises the steps of dividing the received spread spectrum signal into frequency components corresponding to the frequencies f1 to F5, and calculating power level signals indicative of power levels of frequency components, respectively. The acquisition process further comprises the step of differently delaying the calculated power level signals on the basis of the hopping pattern, and summing the delayed power level signals. If the summed power level signals as a whole exceed a predetermined threshold level, the acquisition operation is finished. If the summed power level signals as a whole is smaller than the predetermined threshold level, the foregoing steps of the acquisition process are repeated until the summed power level signal as a whole exceed the predetermined threshold level. By carrying out the acquisition process, the operation of the mobile station IE is synchronized with the receiving of the spread spectrum signal. After the synchronization, the synchronized operation of the mobile station IE is continuously held through the tracking process. The tracking process is carried out by a circuit such as a non-coherent delay locked loop or an oscillation locked loop.

When the hopping pattern is generated by the hopping pattern generator 32 through the acquisition process and the tracking process, the hopping pattern is supplied from the hopping pattern generator 32 to the hopping synthesizer 34. Based on the hopping pattern, the hopping synthesizer 34 is operated to produce a carrier wave that has frequencies f4, f3, f5, f1 and f2 appearing in described order. The produced carrier wave is fed from the hopping synthesizer 34 to the despread demodulator 31.

The carrier wave and the received carrier signal are multiplied by the despread demodulator 31, thereby frequency-converting the received spread spectrum signal to an information signal. The information signal is demodulated through the PSK demodulation techniques by a narrow-band demodulator (not shown), thereby reproducing the transmittance information signal.

Figure 3:
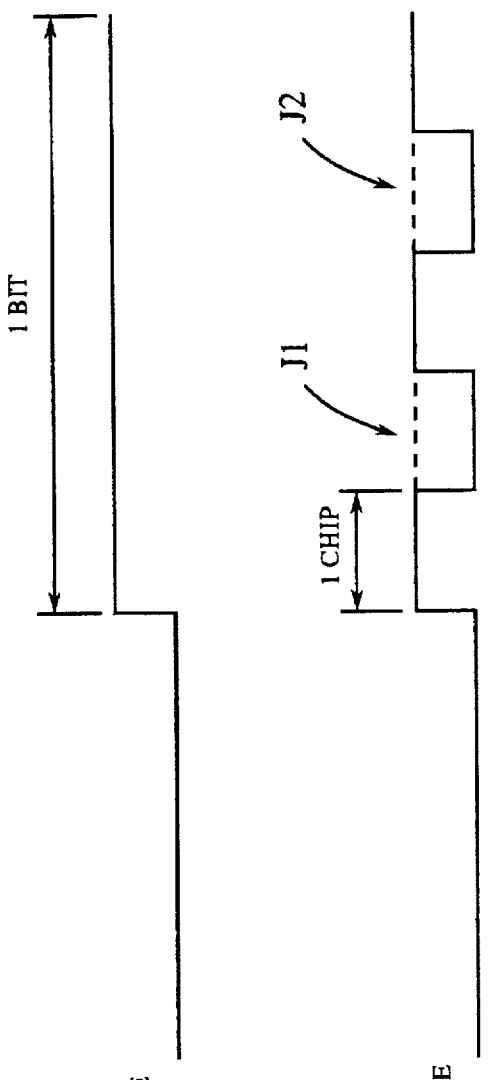
FIG. 3 comprising
Figure 4:
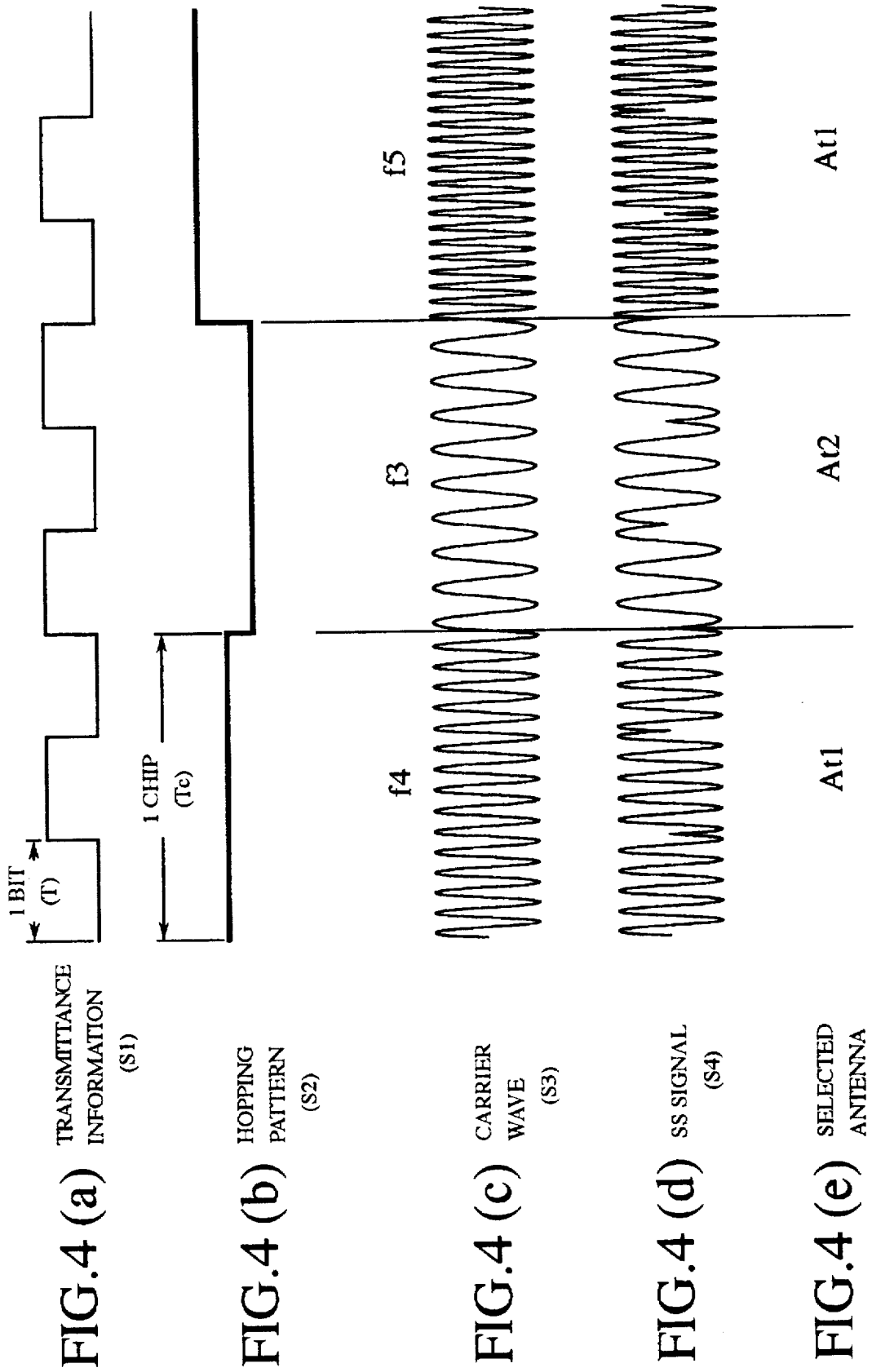
FIG. 4 comprising

As will be understood from FIGS. 2(a) and 2(b), one bit of the information signal is represented by five frequency components corresponding to the five chips of the hopping pattern, respectively. If, for this reason, the spread spectrum signal emitted from the antenna At2 is received by the mobile station IE under the influence of deep fading effects, the mobile station IE is liable to reproduce an information signal which has not only sufficient signal portions but also deficient signal portions. In this case, the transmittance information has two deficient signal portions J1 and J2 as shown in FIG. 3 (b) because of the fact that the first and second antennas At1 and At2 are switched to each other as shown in FIG. 2(e).

The hopping pattern generated by the hopping pattern generator 32 is identical with that generated by the hopping pattern 5 of the base station Te and, therefore, the carrier wave produced by the hopping synthesizer 34 is identical in frequency with the received spread spectrum signal. This means that the received spread spectrum signal has errorless signal portions respectively corresponding to the sufficient portions of the information signal. The errorless signal portions of the spread spectrum signal can be accurately demodulated. The mobile station IE is operative to carry out a majority operation in which the chips having a high level "1" are used as a correct signal if the number of chips having a high level "1" is greater than that of chips having a low level "0", while chips having a low level "0" are used as a correct signal if the number of the chips having a low level "0" is greater than that of chips having a high level "1", thereby making it possible to reproduce the transmittance information. The reproduced transmittance information is shown in FIG. 3(c) as having a high level which is ⅗ times as large as that of the original transmittance information shown in FIG. 3(a). The reproduced transmittance information signal is supplied to the control unit 33.

When the control unit 33 receives the reproduced transmittance information signal, the reply information signal is prepared in response to the reproduced information signal and supplied to the narrow-band modulator (not shown). The replay information signal and is modulated through PSK modulation techniques by the narrow-band modulator. The modulated reply information signal is fed to the spread modulator 35. At the same time, control unit 33 is operated to instruct the hopping pattern generator 32 to generate the hopping pattern.

The spread modulator 35 is operated to multiply the reply information signal by the hopping pattern to frequency-convert the reply information signal into a reply spread spectrum signal. The replay spread spectrum signal is amplified by the transmitting amplifier 36 to a signal level required by the SS communication system, and emitted from the antenna Ai through the circulator CIRi.

When the reply spread spectrum signal is received by the first and second antennas At1 and At2, the reply spread spectrum signal is supplied only from one of said antennas At1 and At2 currently selected by the antenna selector 8 to the receiving amplifier 10 through the antenna selector 8 and the circulator CIRt. The reply spread spectrum signal is amplified by the receiving amplifier 10 to a signal level required by the base station Te, and then supplied from the amplifier 10 to the despread demodulator 11.

As described hereinbefore, the demodulation of the spread spectrum signal necessitates the foregoing acquisition and tracking operations. The control unit 4, therefore, carries out the acquisition and tracking operations on the basis of the reply spread spectrum signal received by either of the antennas At1 and At2. The hopping pattern generator 5 is instructed by the control unit 4 to generate a hopping pattern corresponding to a sequence of frequency components of the reply spread spectrum signal.

The reply spread spectrum signal is frequency-converted by the despread demodulator 11 and demodulated by a narrow-band demodulator (not shown) through the PSK demodulation techniques, thereby reproducing the reply information signal. In the PSK demodulation, an intermediate frequency, e.g., 150 MHz may be utilized for the purpose of enhancing receiving accuracy. Similarly to the mobile station Ie, the base station Te is operated through the majority operation. If there are three chips having the same logic in duration of one bit corresponding to five chips, the logic of three chips is treated as a correct logic of the reply information signal. The reproduced reply information signal is converted by the serial-parallel converter 12 from a serial form to a parallel form and then transmitted to the FIFO buffer 13. The converted reply information signal is temporarily held by, and outputted from the FIFO buffer 13.

The following description will manifest the advantage of the SS communication signal according to the present invention. Now it is assumed that a code error ratio of signal transmission is 5% when the spread spectrum signal is emitted from the first antenna At1 of the base station Te to the antenna Ai of the mobile station Ai, and that the code error ratio of signal transmission is reduced to the extent of 25(%) owing to the fading effect when the spread spectrum signal is emitted from the second antenna At2 of the base station Te to the antenna Ai of the mobile station Ai.

If the antenna At2 is kept in use without being replaced with the antenna At1 during duration of one bit of the information signal, the mobile station IE has the following communication error ratio. When one bit of the spread spectrum signal is emitted from the antenna At2 of the base station Te to the antenna Ai of the mobile station Ie, the communication error ratio is represented by "P1" and defined by the following equation (1) in the event that the code error ratio of the second antenna At2 is 25(%), i.e., five chips as a whole corresponding to the one bit include three or more erroneous chips.

$$P1 = \sum_{j=1}^{2} \{sC_j \times (1 - 0.25)^j \times (0.25)^{5-j}\} = 0.1035 = 10.35(\%) \quad (1)$$

If, on the other hand, the first antenna At1 is kept in use without being replaced with the second antenna At2 during duration of one bit of the information signal, the mobile station Ie has the following communication error ratio. When one bit of the spread spectrum signal is emitted from the first antenna At1 of the base station Te to the antenna Ai of the mobile station IE, the communication error ratio is represented by "P2" and defined by the following equation (2) in the event that the code error ratio of the first antenna At1 is 5%.

$$P2 = \sum_{j=1}^{2} \{sC_j \times (1 - 0.05)^j \times (0.05)^{5-j}\} = 0.0012 = 0.12(\%) \quad (2)$$

As will be understood from the equations (1) and (2), the difference between the communication error ratios P1 and P2 are extremely large, i.e., the communication error ratio is drastically varied depending upon a degree of the fading effect acting on the spread spectrum signal. If the mobile station Ie is operated through a conventional diversity, the mobile station Ie can finally select one of the two received spread spectrum signals which is emitted from the first antenna At1 of the base station Te. To apply the diversity system to the mobile station Ie is, however, at variance with the reality in view that the mobile station is required to become small-sized. In general, the communication system is required to be designed in consideration of communication distance and transmission power in order that the communication is maintained in good condition even if the communication error ratio is held at a high level or 10.35 (%). For this reason, the degree of freedom of the system design is constrained to be restricted within a narrow permissible range.

In the SS communication system according to the present invention, one of the first and second antennas At1 and At2 is exchanged with the other one of the first and second antennas At1 and At2 five times per one bit of the transmittance information signal. When the spread spectrum signals are emitted from the first antenna At1 three times and from the second antenna At2 two times during duration of one bit of the transmittance information signal as shown in FIG. 2(e), the communication error ratio is represented by "P3" and defined by the following equation (3) in the event that the communication error ratio is calculated based on the error ratios determined by combinations of the number of erroneous chips and the first and second antennas At1 and At2: one erroneous chip at the antenna At1 and two erroneous chips at the antenna At2; two erroneous chips at the antenna At1 and one erroneous chip at the antenna At1; ... ; and three erroneous chips at the antenna At1 and two erroneous chips at the antenna At2.

$$P3 = \sum_{h=0}^{2} \sum_{k=3-h}^{3} \{_2C_h \times (0.05)^h \times (1 - 0.05)^{2-h} \times {_3C_k} \times$$

$$(0.25)^k \times (1 - 0.25)^{3-k}\} = 0.03039 = 3.04(\%)$$

When, on the other hand, the spread spectrum signals are emitted from the first antenna At1 two times and from the second antenna At2 three times during duration of one bit of the transmittance information signal, the communication error ratio is represented by "P4" is defined by the following equation (4) in the event that the communication error ratio is calculated based on the error rations determined by combinations of the number of erroneous chips and the antennas At1 and At2: one erroneous chip at the antenna At1 and two erroneous chips at the antenna At2; two erroneous chips at the antenna At1 and one erroneous chip at the antenna At2; ... ; and two erroneous chips at the antenna At1 and three erroneous chips at the antenna At1.

$$P4 = \sum_{h=0}^{2} \sum_{k=3-h}^{3} \{_3C_h \times (0.05)^h \times (1 - 0.05)^{3-h} \times {_2C_k} \times$$

$$(0.25)^k \times (1 - 0.25)^{2-k}\} = 0.01170 = 1.17(\%)$$

As will be appreciated by comparing a difference between the conclusions of the equations (3) and (4) and another difference between the conclusions of the equations (1) and (2), the variation of the communication error ratio in the SS communication system according to the present invention is smaller than that in a conventional SS communication system so that the SS communication system according to the present invention can reduce an influence of the multi-path fading effect. The SS communication system can easily be designed in consideration of the fact that the communication error ratio P is consider to be smaller than 3.04% and, accordingly, enables the degree of freedom for designing those systems to be increased in comparison with that of the conventional SS communication system.

The SS communication system may be designed to observe the power level of the received spread spectrum signal and carry out the foregoing majority operation on the basis of the power level of the received spread spectrum signal, thereby making it possible to reduce the communication error ratio. In this case, the SS communication system may be operated to use a received code weighted summation device and a code summation device. The received code weighted summation device is designed to output "1" when the power level of the received spread spectrum signal exceeds a predetermined threshold level and when the logic of the demodulation conclusion is "1", output "−1" when the power level of the received spread spectrum signal exceeds the predetermined threshold level and when the logic of the demodulation conclusion is "0", and output "0" when the power level of the received spread spectrum signal is smaller than the predetermined threshold level. The code summation device is designed to sum all the output codes from the received code weighted summation device over one bit of a transmitting signal. When the code summation device outputs a positive value, the logic of the one bit of the transmitting signal is regarded as "1". When the code summation device outputs a negative value, the logic of the one bit of the information signal is regarded as "0". Providing that the SS communication system is operated to use the received code weighted summation device and the code summation device thus constructed, the SS communication system is able to select a received signal having a relatively high power level and a relatively small communication error ratio. As a consequence, the communication error ratio can be further reduced.

According to the first embodiment of the SS communication system, the base station Te is operated to change one of the first and second antennas At1 and At2 to the other one of the first and second antennas At1 and At2 in a simultaneous relationship with the chip of the hopping pattern generated, thereby enabling the mobile station Ie to receive the spread spectrum signal without the influence of the multipath fading effect. It is therefore to be understood that the mobile station Ie of the conventional spread spectrum communication system has a complicated construction resulting from having a diversity system which is generally complicated in construction, while the mobile station Ie of the spread spectrum communication system according to the present invention has a simple construction resulting from having no diversity system. This makes it possible to decrease the mobile station Ie in size, weight and cost. This advantage becomes noticeable when the mobile station Ie is used for a radio terminal such as a radio ID tag, wireless IC card, a hand-held walkie-talkie, a mobile telephone for a vehicle, a hand-held radio terminal, a cordless telephone and a paging receiver or a cellular telephone.

Although the base station Te is operated to use the hopping pattern having chips each shorter in duration than each bit of the transmittance information signal as shown in FIGS. 2(a) and 2(b), the base station Te may be operated to use a hopping pattern having chips each larger in duration than each bit of the transmittance information signal as shown in FIGS. 4(a) and 4(b). If the base station Te uses the transmittance inform signal and the hopping pattern shown in FIGS. 4(a) and 4(b), respectively, the carrier wave and the spread spectrum signal are shown as being fluctuated in FIGS. 4(c) and 4(d), respectively, while either one of the antennas At1 and At2 is shown as being selected in FIG. 4(e) during the fluctuations of the carrier wave and the spread spectrum signal.

Figure 5:
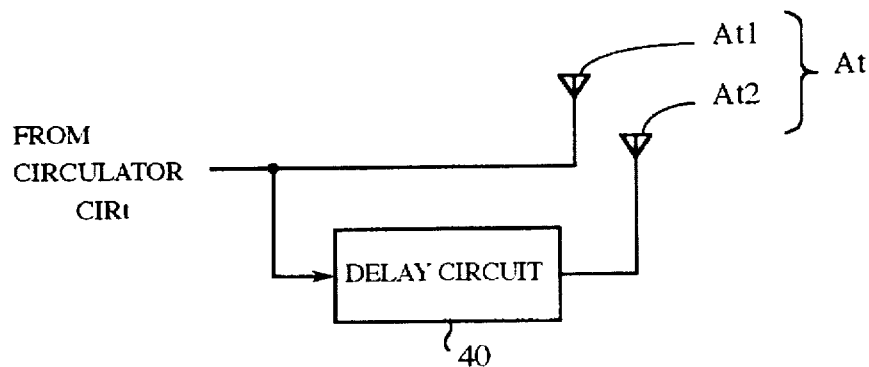
FIG. 5 is a block diagram showing a second embodiment of the SS communication system according to the present invention.

FIG. 5 of the drawings shows a preferred second embodiment of the SS communication system according to the present invention. The second embodiment of the SS communication system includes constitutional elements same as those of the first embodiment of the SS communication system. Although the particular constitutional elements of the second embodiment are not shown in FIG. 5 except the antennas At1 and At2 for avoiding tedious repeated depiction thereof, the constitutional elements of the second embodiment are respectively designated by the reference numerals and symbols same as those of the individual constitutional elements of the first embodiment, and will now be described with reference to FIG. 1 as well as FIG. 5. Although the antennas At1 and At2 are spatially uncorrelated with each other in the first embodiment shown in FIG. 1, the antennas At1 and At2 are spatially correlated with other in the second embodiment shown in FIG. 5.

As shown in FIG. 5, the second embodiment of the SS communication system comprises a delay circuit 40 substituted for the antenna selector 8 of the first embodiment of the SS communication system. The delay circuit 40 is interposed between the circulator CIRt and the antenna At2 for delaying the passing spread spectrum signal by a predetermined time t0 with respect to the spread spectrum signal to be supplied from the first antenna At1. When the predetermined delay time t0 is assumed to be 24.053 nsec, the spread spectrum signals of 2494.4 MHz are emitted from the first and second antennas At1 and At2 of the base station Te in a co-phased relationship with each other. When the predetermined delay time t0 is similarly assumed to be 24.053 nsec, the spread spectrum signals of 2473 MHz are emitted from first and second antennas At1 and At2 of the base station Te in inverse-phase phased relationship with each other. The difference in phase between the spread spectrum signals to be supplied to the first and second antennas At1 and At2, respectively, is varied with the frequency of the spread spectrum signal outputted from the circulator CIRt. This means that the spread spectrum signals emitted from the first and second antennas At1 and At2 are varied in interference of waves with the frequency of the spread spectrum signal outputted from the circulator CIRt and, as a consequence, the antenna unit At of the base station Te is varied in directivity with the frequency of the spread spectrum signal outputted from the circulator CIRt.

Similarly to the first embodiment of the SS communication system, the mobile station Ie of the second embodiment can receive the spread spectrum signal without the influence of the multipath fading effect. It is therefore to be understood that the mobile station Ie of the conventional spread spectrum communication system has a complicated construction resulting from having a diversity system which is generally complicated in construction, while the mobile station Ie of the spread spectrum communication system according to the present invention has a simple construction resulting from having no diversity system. This makes it possible to decrease the mobile station Ie in size, weight and cost. The second embodiment is further advantageous in that the spread spectrum signals of high quality can be emitted from the first and second antennas At1 and At2, respectively, because of the fact that it is unnecessary for the base station Te to be provided with an antenna selector which is apt to make switching noises.

In the second embodiment of the SS communication system, the antenna unit At is constituted by the two first and second antennas At1 and At2. If, however, desired, the antenna unit At may be constituted by one array antenna having a plurality of antenna elements. In case that the antenna unit At is thus constructed, the delay circuit 40 is operated to cause the passing spread spectrum signal to arrive at slightly different times, respectively. The antenna unit At thus constructed serves as a phased array antenna having a variable directivity and, accordingly, not only the base station Te can be simple in construction but also the directivity of the antenna unit At can be facilitated to fit with a communication between the base station Te and the mobile station Ie.

Figure 6:
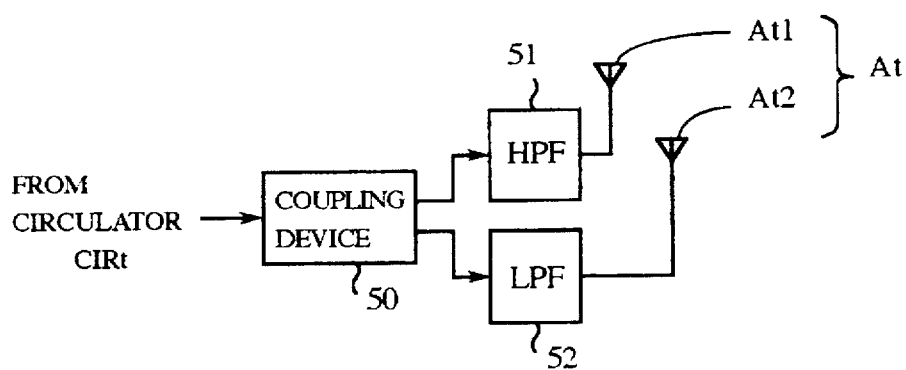
FIG. 6 is a block diagram showing a third embodiment of the SS communication system according to the present invention.

FIG. 6 of the drawings shows a preferred third embodiment of the SS communication system according to the present invention. The third embodiment of the SS communication system includes constitutional elements same as those of the first embodiment of the SS communication system. Although particular the constitutional elements of the third embodiment are not shown in FIG. 6 except the first and second antennas At1 and At2 for avoiding tedious repeated depiction thereof, the constitutional elements of the third embodiment are respectively designated by the reference numerals and symbols same as those of the individual constitutional elements of the first embodiment, and will now be described with reference to FIG. 1 as well as FIG. 6.

As shown in FIG. 6, the third embodiment of the SS communication system comprises a coupling device 50, a high pass filter 51 and a low pass filter 52 as a whole substituted for the antenna selector 8 of the first embodiment of the SS communication system. The high pass filter 51 is interposed between the circulator CIRt and the first antenna At1 of the antenna unit At for allowing only frequency components higher than a cut-off frequency fc1 of the spread spectrum signal to be supplied from the circulator CIR1 to the first antenna At1, while the low pass filter 52 is interposed between the circulator CIRt and the second antenna At2 of the antenna unit At for allowing only frequency components lower than a cut-off frequency fc2 to be supplied from the circulator CIRt to the second antenna At2. The coupling device 50 is interposed between the circulator CIRt and the antenna unit At for electrically connecting the circulator CIRt to the high pass filter 51 and the low pass filter 52. It is assumed that fc1=fc2=2484.0 MHz.

If the spread spectrum signal of relatively high frequency f4 or 2489.2 MHz is fed from the circulator CIRt to the high pass filter 51 and the low pass filter 52 through the coupling device 50, the spread spectrum signal passes only through the high pass filter 51 and is emitted only from the first antenna At1 of the antenna unit At. If the spread spectrum signal of relatively low frequency f1 or 2473.6 MHz is fed from the circulator CIRt to the high pass filter 51 and the low pass filter 52 through the coupling device 50, the spread spectrum signal passes only through the low pass filter 52 and is emitted only from the second antenna At2 of the antenna unit At. In general, a difficulty is encountered in forming filters such as the high pass filter 51 and the low pass filter 52 for use in filtering of the spread spectrum signal. In order to overcome the difficulty, it is desired that logarithmic filters having a quality factor Q of large level are used as the high pass filter 51 and the low pass filter 52. Alternatively, each of the high pass filter 51 and the low pass filter 52 may be so constructed as to include a phase-locked loop or PLL circuit. The filters 51 and 52 thus constructed each brings a considerably larger quality factor Q to the spread spectrum signal.

As will be appreciated from the foregoing description of the third embodiment of the SS communication system, the spread spectrum signal is emitted alternatively from the first and second antennas At1 and At2 in a simultaneous relationship to the frequency variation of the spread spectrum signal and, as a result, the spread spectrum signal is emitted alternatively from two different signal emission positions when the chip of the hopping pattern is generated. It is therefore to be understood that the mobile station Ie of the conventional spread spectrum communication system has a complicated construction resulting from having a diversity system which is generally complicated in construction, while the mobile station Ie of the spread spectrum communication system according to the present invention has a simple construction resulting from having no diversity system. This makes it possible to decrease the mobile station Ie in size, weight and cost. The third embodiment is further advantageous in that the spread spectrum signals of high quality can be emitted from the first and second antennas At1 and At2, respectively. That is because the base station Te is unnecessary to be equipped with an antenna selector which is apt to make switching noises. The third embodiment is further advantageous in that the transmittance information can be held in continues state. This advantage is noticeable when the PSK modulation techniques are applied to the SS communication system.

Figure 7:
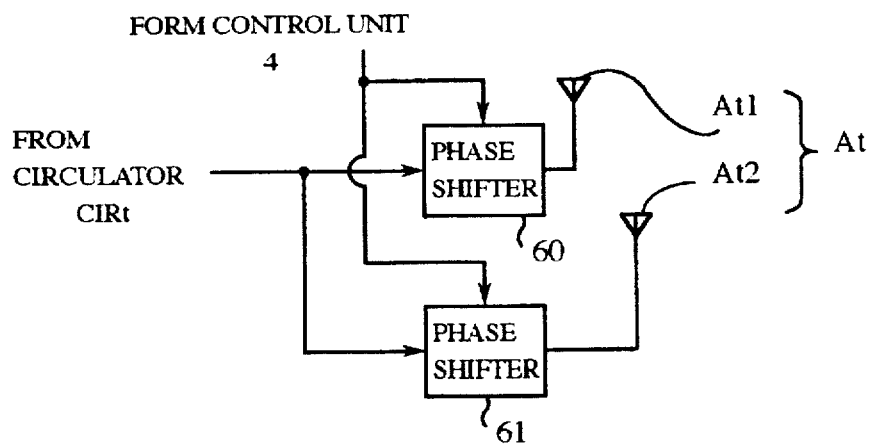
FIG. 7 is a block diagram showing a fourth embodiment of the SS communication system according to the present invention.

FIG. 7 of the drawings shows a preferred fourth embodiment of the SS communication system according to the present invention. The fourth embodiment of the SS communication system includes constitutional elements same as those of the first embodiment of the SS communication system. Although the particular constitutional elements of the third embodiment are not shown in FIG. 6 except the first and second antennas At1 and At2 for avoiding tedious repeated depiction thereof, the constitutional elements of the fourth embodiment are respectively designated by the reference numerals and symbols same as those of the individual constitutional elements of the first embodiment, and will now be described with reference to FIG. 1 as well as FIG. 7. Although the first and second antennas At1 and At2 are spatially uncorrelated with each other in the first embodiment shown in FIG. 1, the first and second antennas At1 and At2 are spatially correlated with other in the fourth embodiment shown in FIG. 7.

As shown in FIG. 7, the fourth embodiment of the SS communication system comprises a first phase shifter 60 and a second phase shifter 61 as a whole substituted for the antenna selector 8 of the first embodiment of the SS communication system. The first phase shifter 60 is interposed between the circulator CIRt and the first antenna At1 of the base station Te, while the second phase shifter 61 is interposed between the circulator CIRt and the second antenna At2 of the base station Te. The first and second phase shifters 61 and 62 are controlled by the control unit 4 to shift the phases of the passing spread spectrum signals by different shift amounts, respectively. The first and second phase shifters 61 and 62 are disclosed for example in Japanese Patent Laid-open Publication No. 7-38304. More specifically, the control unit 4 is operated to determine the shift amounts of the first and second phase shifter 60 and 61 in accordance with the frequency components, respectively, whenever the hopping pattern is generated by the hopping pattern generator 5. The shifted spread spectrum signals are emitted from the first and second antennas At1 and At2 and accordingly the emitted spread spectrum signals are varied in interference of waves with the frequency of the emitted spread spectrum signal. This means that the antenna unit At is varied in directivity with the frequency of the spread spectrum signal outputted from the circulator CIRt. It is therefore to be understood that the mobile station Ie of the conventional spread spectrum communication system has a complicated construction resulting from having a diversity system which is generally complicated in construction, while the mobile station Ie of the spread spectrum communication system according to the present invention has a simple construction resulting from having no diversity system. This makes it possible to decrease the mobile station Ie in size, weight and cost. The fourth embodiment is further advantageous in that the spread spectrum signals of high quality can be emitted from the antennas At1 and At2, respectively, because the base station Te is unnecessary to be provided with an antenna selector that is apt to make switching noises.

In the fourth embodiment of the SS communication system, the antenna unit At is constituted by the two antennas At1 and At2. If, however, desired, the antenna unit At may be constituted by an array antenna having a plurality of antenna elements. In case that the antenna unit At is thus constructed, the base station Te comprises phase shifters equal in number to the antenna elements of the antenna At and each interposed between the circulator CIRt and each antenna elements of the array antenna. The phase shifters are operated to shift the phases of the passing spread spectrum signals by different shift amounts, respectively. Such the antenna unit At thus constructed serves as a phased array antenna having a variable directivity and, accordingly, not only the base station Te can be simple in construction but also the directivity of the antenna unit At can be facilitated to fit with a communication between the base station Te and the mobile station Ie. The directivity of the phased array antenna may be controlled through control techniques disclosed in Japanese Patent Laid-open Publication Nos. 7-288417 and 7-170117, and Japanese Provisional Patent Nos. 7-70903 and 7-28173. In the case that the control techniques disclosed in the publications and provisional patents are applied to the present embodiment of the SS communication, the hopping pattern may be used as each of directivity control signals taught by the publications and provisional patents.

Figure 8:
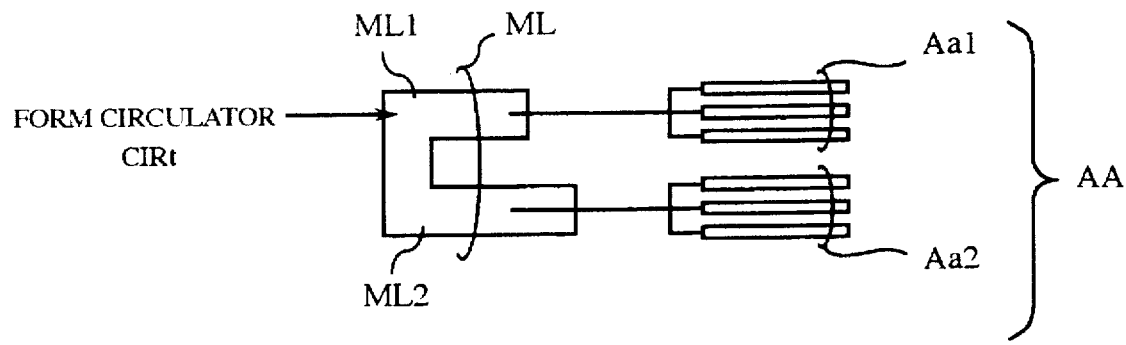
FIG. 8 is a block diagram showing a fifth embodiment of the SS communication system according to the present invention.

FIG. 8 of the drawings shows a preferred fifth embodiment of the SS communication system according to the present invention. The fifth embodiment of the SS communication system includes constitutional elements same as those of the first embodiment of the SS communication system. Although particular the constitutional elements of the second embodiment are not shown in FIG. 8 for avoiding tedious repeated depiction thereof, the constitutional elements of the fifth embodiment are respectively designated by the reference numerals and symbols same as those of the individual constitutional elements of the first embodiment, and described with reference to FIG. 1 as well as FIG. 8.

As shown in FIG. 8, the fifth embodiment of the SS communication system comprises a microstrip line ML substituted for the antenna selector 8 of the first embodiment of the SS communication system, a first array antennas Aa1 substituted for the first antenna At1 of the first embodiment, and a second array antenna Aa2 substituted for the second antenna At2 of the first embodiment. The first and second array antennas Aa1 and Aa2 as a whole form an antenna unit AA and each comprises a plurality of antenna elements. Each of the array antennas Aa1 and Aa2 is shown by way of example in FIG. 8 as comprising three antenna elements. The antenna elements of each of the first and second array antennas Aa1 and Aa2 are equal in length to one another and spaced apart from one another at a distance determined by $\lambda/4$ wherein $\lambda$ is the longest wave length of the spread spectrum signal. If λ is 12.08 cm, λ/4 is 3.02 cm. The microstrip line ML is interposed between the circulator CIRt and the antenna unit AA and has a first branch portion ML1 electrically connected to the first array antenna Aa1, and a second branch portion ML2 electrically connected to the second array antenna Aa2. The antenna unit AA of the base station Te is formed by a printed board.

The microstrip line ML is designed to drastically decrease in impedance only one of the first and second branch portions M1 and M2 when a certain frequency component is fed to the microstrip line ML. In the present embodiment, the first branch portion ML1 is drastically decreased in impedance when the microstrip line Me receives the spread spectrum signal of frequency f2 from the circulator CIRt, while the second branch portion ML2 is drastically decreased in impedance when the microstrip line Me receives the spread spectrum signal of frequency f4 from the circulator CIRt. When the spread spectrum signal of frequency f3 from the circulator CIRt is fed to the microstrip line ML, the first and second branch portions ML1 and ML2 are approximately equally decreased in impedance.

When the spread spectrum signal of frequency f2 is supplied from the circulator CIRt toward the antenna unit AA through the microstrip line ML, the spread spectrum signal of frequency f2 is mainly received by the first antenna array Aa1 of the antenna unit AA. Since the mobile station Ie is generally spaced apart from the antenna unit AA of the base station Te at a considerably long distance, the mobile station Ie judges that the spread spectrum signal of frequency f2 is emitted only from the first antenna array Aa1 of the antenna unit AA of the base station Te. When the spread spectrum signal of frequency F4 is supplied from the circulator CIRt toward the antenna unit AA through the microstrip line ML, the spread spectrum signal of frequency f4 is mainly received by the antenna array Aa2 of the antenna unit AA. For the same reason, the mobile station Ie judges that the spread spectrum signal of frequency f2 is emitted only from the second antenna array Aa2 of the antenna unit AA of the base station Te. When the spread spectrum signal of frequency f3 is supplied from the circulator CIRt toward the antenna unit AA through the microstrip line ML, the spread spectrum signal of frequency f3, the spread spectrum signal of the frequency f3 is approximately equally received by the first and second array antennas Aa1 and Aa2 of the antenna unit AA. In this instance, the mobile station Ie judges that the spread spectrum signal of frequency f3 is emitted from a signal emission position between the first and second array antennas Aa1 and Aa2 of the antenna unit AA of the base station Te.

According to the fifth embodiment, the signal emission position from which the spread spectrum signal is emitted is varied with the frequency of the spread spectrum signal so that the mobile station Ie can receive the spread spectrum signal without the influence of the multipath fading effect. It is therefore to be understood that the mobile station Ie of the conventional spread spectrum communication system has a complicated construction resulting from having a diversity system which is generally complicated in construction, while the mobile station Ie of the spread spectrum communication system according to the present invention has a simple construction resulting from having no diversity system. This makes it possible to decrease the mobile station Ie in size, weight and cost. The fifth embodiment is further advantageous in that the spread spectrum signals of high quality can be emitted from the antenna unit AA because of the fact that it is unnecessary for the base station Te to be provided with an antenna selector that is apt to make switching noises. The antenna unit AA of the base station Te is formed by a printed board so that the base station Te also inevitably has a simple construction. Although the number of the array antennas of the antenna unit AA is two, the antenna unit AA may be provided with three or more array antennas. In case that the antenna unit AA is thus constructed, the array antennas may be spaced from one another at a distance smaller than λ/4 for the purpose of restricting the length of the antenna unit AA within a practical range or about 5 cm.

The base station Te is equipped with, as a device used to control the emission position of the spread spectrum signal, a microstrip line which is manufactured through relatively easy processes such as planar processes for semiconductor devices, thereby enabling the base station Te to decrease in cost and thereby enhance the performance of the microstrip line in frequency selection. The microstrip line can employ other strip line constructions disclosed in Japanese Patent Laid-open Publication Nos. 7-94908 and 7-193409, thereby making it possible to enhance the performance of the microstrip line in frequency selection.

While the signal emission position from which the spread spectrum signal is emitted is varied depending upon properties of the microstrip line ML, the signal emission position may be varied depending upon a difference in length between the first and second array antennas Aa1 and Aa2 of the antenna unit AA. More specifically, the antenna unit AA may comprise a plurality of array antennas the number of which is equal to that of the frequency components of the spread spectrum signal and each of which is constituted by a plurality of antenna elements having the same length. For instance, the array antennas consist of first to fifth array antennas corresponding to the frequencies f1 to f5, respectively, and differ from one another in length of antenna element. The first array antenna comprises a plurality of antenna elements each having a length defined by λ/4 wherein λ is a wave length of the spread spectrum signal of frequency f1. In this case, λ/4=3.0320 cm because f1=2473.6 MHz. The second array antenna comprises a plurality of antenna elements each having a length defined by λ/4 wherein λ is a wave length of the spread spectrum signal of frequency f2. In this case, λ/4=3.0257 cm because f2=2478.8 MHz. The third array antenna comprises a plurality of antenna elements each having a length defined by λ/4 wherein λ is a wave length of the spread spectrum signal of frequency f3. In this case, λ/4=3.0193 cm because f3=2484.0 MHz. The fourth array antenna comprises a plurality of antenna elements each having a length defined by λ/4 wherein λ is a wave length of the spread spectrum signal of frequency f4. In this case, λ/4=3.0130 cm because f4=2489.2 MHz. The fifth array antenna comprises a plurality of antenna elements each having a length defined by λ/4 wherein λ is a wave length of the spread spectrum signal of frequency f5. In this case, λ/4=3.0067 cm because f2=2494.4 MHz. If the spread spectrum signal is fed to the antenna unit thus constructed, the position from which the spread spectrum signal is emitted is automatically changed between the first to fifth array antennas in a simultaneous relationship to the frequency variation of the spread spectrum signal without recourse to the microstrip line ML. Accordingly, The terminal station Te can be constructed without being equipped with the microstrip line ML and, for this reason, the base station Te can be simplified all the more.

Figure 9:
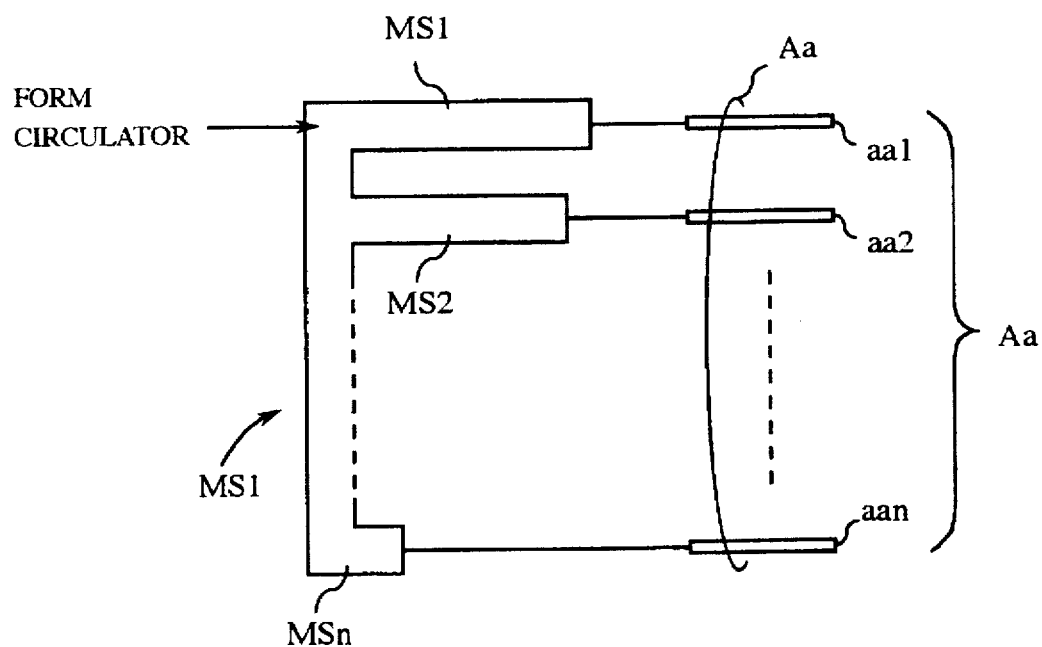
FIG. 9 is a block diagram showing a sixth embodiment of the SS communication system according to the present invention.

FIG. 9 of the drawings shows a preferred sixth embodiment of the SS communication system according to the present invention. The sixth embodiment of the SS communication system includes constitutional elements same as those of the sixth embodiment of the SS communication system. Although particular the constitutional elements of the second embodiment are not shown in FIG. 9 for avoiding tedious repeated depiction thereof, the constitutional elements of the sixth embodiment are respectively designated by the reference numerals and symbols same as those of the individual constitutional elements of the first embodiment, and described with reference to FIG. 1 as well as FIG. 9.

As shown in FIG. 9, the sixth embodiment of the SS communication system comprises a microstrip line MS substituted for the antenna selector 8 of the first embodiment of the SS communication system and an array antenna Aa substituted for the first and second antennas At1 and At2 of the first embodiment. The array antenna Aa has a plurality of antenna elements consisting first to nth antenna elements denoted by symbols "aa1", "aa2" . . . , and "aan", respectively. The first to nth antenna elements are equal in length to one another. The microstrip line MS is interposed between the circulator CIRt and the antenna unit Aa and has first to nth branch portions MS1 to MSn electrically connected to the first to nth antenna elements aa1 to aan, respectively. The antenna unit Aa of the base station Te is formed by a printed board.

The microstrip line MS is designed to drastically decrease in impedance one of the first to nth branch portions MS1 to MSn when a certain frequency component of the spread spectrum signal is received by the microstrip line MS. Assuming that n=5, the following description will be made. The first branch portion MS1 is drastically decreased in impedance when the microstrip line MS receives the spread spectrum signal of frequency f1 from the circulator CIRt. The second branch portion MS2 is drastically decrease in impedance when the microstrip line MS receives the spread spectrum signal of frequency f2 from the circulator CIRt. The third branch portion MS3 is drastically decrease in impedance when the microstrip line MS receives the spread spectrum signal of frequency f3 from the circulator CIRt. The fourth branch portion MS4 is drastically decrease in impedance when the microstrip line MS receives the spread spectrum signal of frequency f4 from the circulator CIRt. The fifth branch portion MS5 is drastically decrease in impedance when the microstrip line MS receives the spread spectrum signal of frequency f5 from the circulator CIRt.

When the spread spectrum signal of frequency f1 is supplied from the circulator CIRt toward the antenna unit AA through the microstrip line MS, the spread spectrum signal of frequency f1 is mainly fed to the antenna element aa1 of the antenna unit Aa. Since the mobile station Ie is generally spaced apart from the antenna unit Aa of the base station Te at a sufficient long distance, the mobile station Ie judges that the spread spectrum signal of frequency f1 is emitted only from the antenna element aa1 of the antenna unit Aa of the base station Te. When the spread spectrum signals of frequencies f2 to f5 are supplied from the circulator CIRt toward the antenna unit Aa through the microstrip line MS, the spread spectrum signals of frequencies f2 to f5 are mainly fed to the antenna elements Aa2 to As5, respectively. For the same reason, the mobile station IE judges that the spread spectrum signals of frequencies f2 to f5 are emitted only from the antenna elements aa2 to aa5, respectively.

According to the sixth embodiment, the signal emission position from which the spread spectrum signal is emitted is varied with the frequency components of the spread spectrum signal so that the mobile station Ie can receive the spread spectrum signal without the influence of the multipath fading effect. It is therefore to be understood that the mobile station Ie of the conventional spread spectrum communication system has a complicated construction resulting from having a diversity system which is generally complicated in construction, while the mobile station Ie of the spread spectrum communication system according to the present invention has a simple construction resulting from having no diversity system. This makes it possible to decrease the mobile station Ie in size, weight and cost. The sixth embodiment of the SS communication is further advantageous in that the spread spectrum signals of high quality can be emitted from the array antenna Aa because of the fact that the base station Te can be constructed without being provided with an antenna selector that is apt to make switching noises. It is also unnecessary for the base station Te to be equipped with a plurality of array antennas, so that the construction of the base station can be further simplified in comparison with the fifth embodiment of the SS communication system. The base station Te employs, as a device used to control the emission position of the spread spectrum signal and, for this reason, a microstrip line which is manufacture through relatively easy processes such as planar processes for semiconductor devices, thereby enabling the base station Te to decrease in cost and thereby enhancing the performance of the microstrip line in frequency selection. The microstrip line MS can employ other strip line constructions disclosed in the foregoing Japanese Patent Laid-open Publication Nos. 7-94908 and 7-193409, thereby making it possible to further enhance the performance of the microstrip line in frequency selection.

Although the signal emission position from which the spread spectrum signal is emitted is varied depending upon properties of the microstrip line MS, the signal emission position may be varied depending upon differences in length between the first to fifth antenna elements aa1 to aa2 of the array antenna unit Aa. More specifically, the array antenna unit Aa may comprise antenna elements the number of which is equal to that of the frequency components of the spread spectrum signal. The antenna elements consist of first to fifth array antennas corresponding to the frequencies f1 to f5 of the spread spectrum signal, respectively, and differ in length from one another. Preferably, not only does the array antenna Aa have a length of λ/4 or more, i.e., about 5 cm or more in a direction which is at a right angle with longitudinal direction of each antenna element thereof, but the first to fifth antenna elements of the array antenna Aa also have lengths of 3.0320, 3.0257, 3.0193, 3.0130 and 3.0067 cm corresponding to frequencies f1 to f5 of the spread spectrum signal, respectively. If the spread spectrum signal is fed to the antenna unit thus constructed, the signal emission position from which the spread spectrum signal is emitted is automatically changed between the first to fifth array antennas in a simultaneous relationship to the frequency variation of the spread spectrum signal without recourse to the microstrip line MS. Accordingly, the terminal station Te can be constructed without being provided with the microstrip line MS and, for this reason, the base station Te can be simplified all the more.

While the first to fourth embodiments of the SS communication system according to the present invention have been described as employing the two antennas At1 and At2 as an antenna unit At of the base station Te, it will be apparent that the first to fourth embodiments according to the present invention may employ three or more antennas as the antenna unit At of the base station Te. It will be, furthermore, apparent that the foregoing embodiments of the SS communication system according to the present invention can be modified as follows.

Figure 10:
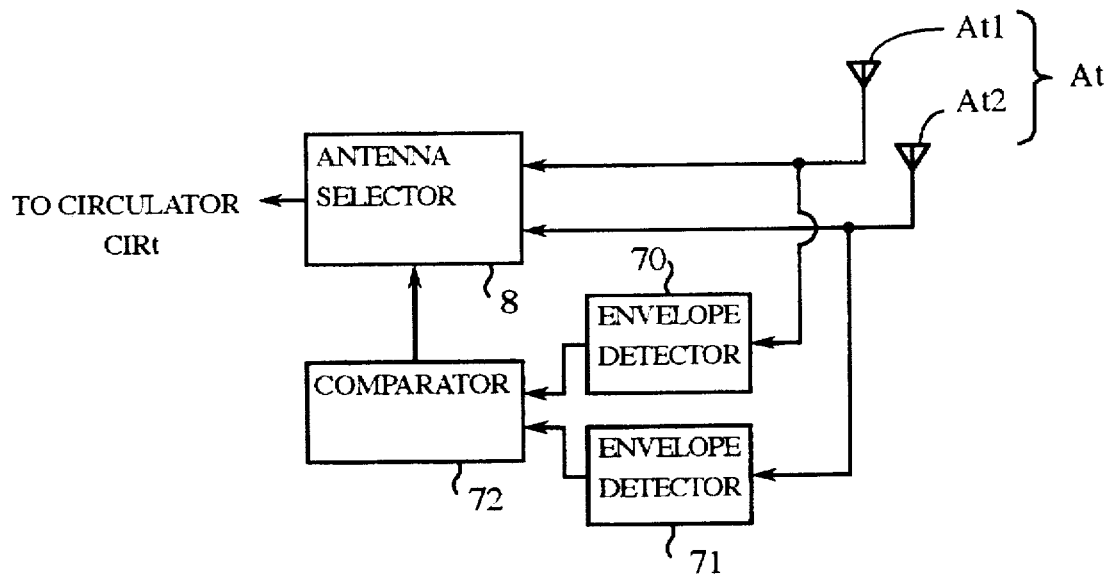
FIG. 10 is a block diagram showing a diversity system applied to the base station shown in FIG. 1.

Each of the first to sixth embodiments of the SS communication system can employ a diversity system for the purpose of enhancing the receiving performance of the base station Te. If the first embodiment of the SS communication system employs a selection diversity system, the base station Te is required to further comprises a first envelope detector 70, a second envelope detector 71 and comparator 72 as shown in FIG. 10. The first envelope detector 70 is interposed between the first antenna At1 and the comparator 72 for producing and outputting an envelope of the spread spectrum signal received by the first antenna At1, while the second envelope detector 71 is interposed between the second antenna At2 and the comparator 72 for producing and outputting an envelope of the spread spectrum signal received by the second antenna At2. The comparator 72 is adapted to compare the envelopes outputted from the first and second envelope detectors 70 and 71 to select one of the two envelopes which is larger than the other one of the two envelopes. The antenna selector 8 is operated to supply the spread spectrum signal to the circulator CIRt only from one of the first and second antennas At1 and At2 bringing the larger one of the two envelopes to the comparator 72. The despread demodulator 11 can habitually receives the spread spectrum signal of large intensity from the antenna selector 8 and, for this reason, the multipath fading effect can be reduced.

Figure 11:
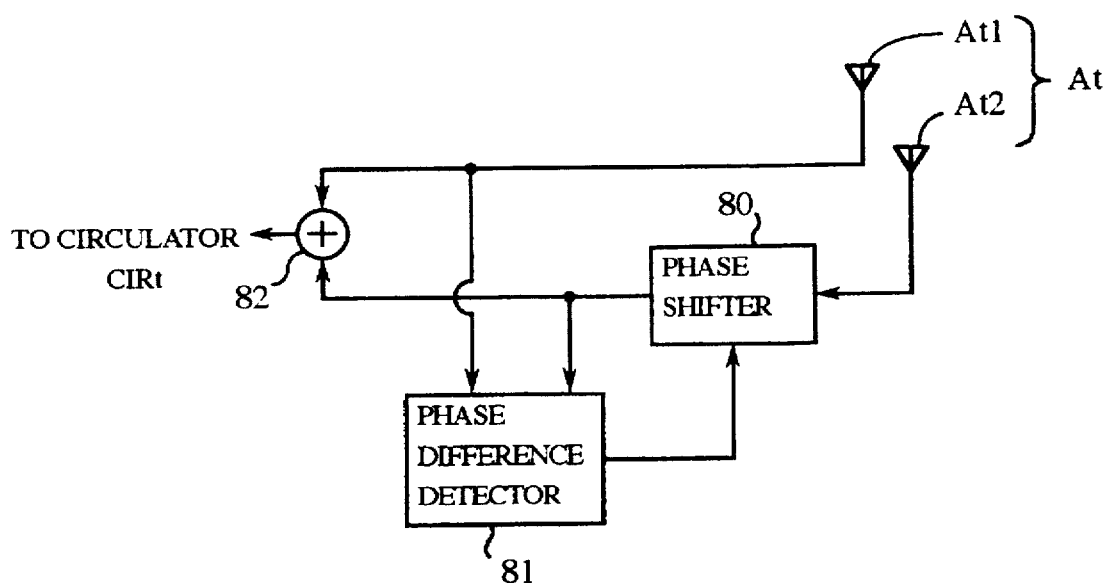
FIG. 11 is a block diagram showing another diversity system applied to the base station shown in FIG. 1.

If the first to fourth embodiment of the SS communication system employs a combining diversity system, the base station Te is required to further comprises a phase shifter 80, a phase difference detector 81 and a summer 82 as shown in FIG. 11. The summer 82 is interposed between the antenna unit At and the circulator CIRt for summing the spread spectrum signals received by the first and second antennas At1 and At2 and feeding the summed signal to the circulator CIRt. The phase sifter 80 is interposed between the second antenna At2 and the summer 82 for shifting the phase of the spread spectrum signal received by the second antenna At2. The phase difference detector is adapted to detect a difference in phase between the spread spectrum signals respectively fed from the first antennas At1 and At2 and control the phase shifter 80 to match the phases of the two spread spectrum signals. Similarly to the selection diversity system, the combining diversity system can is operated to reduce the multipath fading effect. The base station Te of each embodiment of the SS communication system according to the present invention can employ other diversity systems disclosed for example in Japanese Patent Laid-open Publication Nos. 6-284054 and 7-240708, thereby making it possible to reduce the multipath fading effect all the more.

While each antenna of the base station Te in the foregoing embodiments is assumed by way of example to be a dipole antenna or an array antenna, each antenna of the base station Te may be a helical antenna or a cross dipole antenna. For example, the helical antenna is operative to assume two different operation modes consisting of an end fire mode and a broadside mode, and has a directivity that is varied simultaneously when the operation mode of the helical antenna is changed between the end fire mode and the broadside mode. Japanese Patent Laid-open Publication No. 7-263945 teaches another helical antenna adaptable for the antenna of the base station in which its directivity can be varied without recourse to the change of the operation mode. When the helical antenna or the cross dipole antenna is employed as the antenna of the base station Te, one helical antenna or cross dipole antenna is sufficient for the base station Te to reduce the multipath fading effect. As a result, the construction of the base station Te can be simplified.

In the meantime, the signal propagation character of the spread spectrum signal can be varied by varying the spread spectrum signal in aspect of polarization plane with frequency of the spread spectrum signal. If, for instance, the first and second array antennas Aa1 and Aa2 shown in FIG. 8 are arranged in orthogonal relationship to each other, the spread spectrum signal emitted from the antenna unit At is varied in aspect of polarization plane with frequency of the spread spectrum signal. In addition, the signal propagation character can be varied by varying the spread spectrum signal in rotational direction of polarization plane with the frequency of the spread spectrum signal. If, for example, the first and second array antennas AA1 and AA2 shown in FIGS. 5 and 7 are arranged in an orthogonal relationship to each other, the spread spectrum signal emitted form the antenna unit At is varied in rotational direction of polarization plane with the frequency of the spread spectrum signal. Japanese Provisional Patent No. 7-83207, Japanese Provisional Patent No. 7-24361 or Japanese Utility Model Publication No. 7-25608 teaches a circular polarization antenna capable of varying the rotational direction of the polarization plane with the frequency of the spread spectrum signal. When the circular polarization antenna is employed as an antenna of the base station Te, one antenna is sufficient for the base station Te to reduce the multipath fading effect. As a result, the construction of the base station Te can be simplified.

Figure 12:
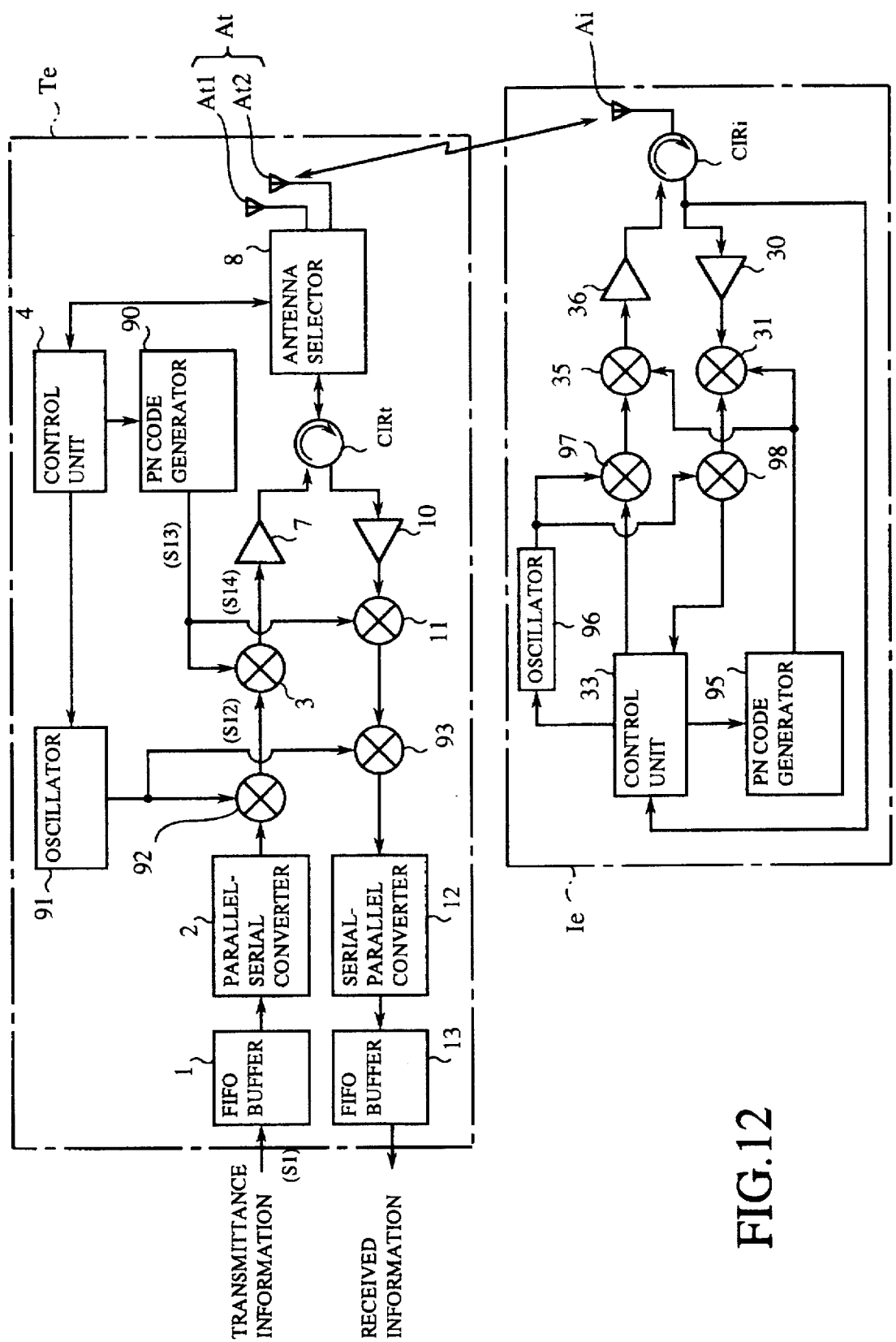
FIG. 12 is a block diagram showing a seventh embodiment of the SS communication system according to the present invention.

FIGS. 12 and 13(a) to 13(e) of the drawings show a preferred seventh embodiment of the SS communication system according to the present invention. The seventh embodiment of the SS communication system includes constitutional elements same as those of the first embodiment of the SS communication system. The constitutional elements of the seventh embodiment are respectively designated by the reference numerals and symbols same as those of the individual constitutional elements of the first embodiment for avoiding tedious repeated description thereof. The SS communication system shown in FIG. 12 is operated not through FH-SS communication techniques but through DS-SS communication techniques.

Figure 13:
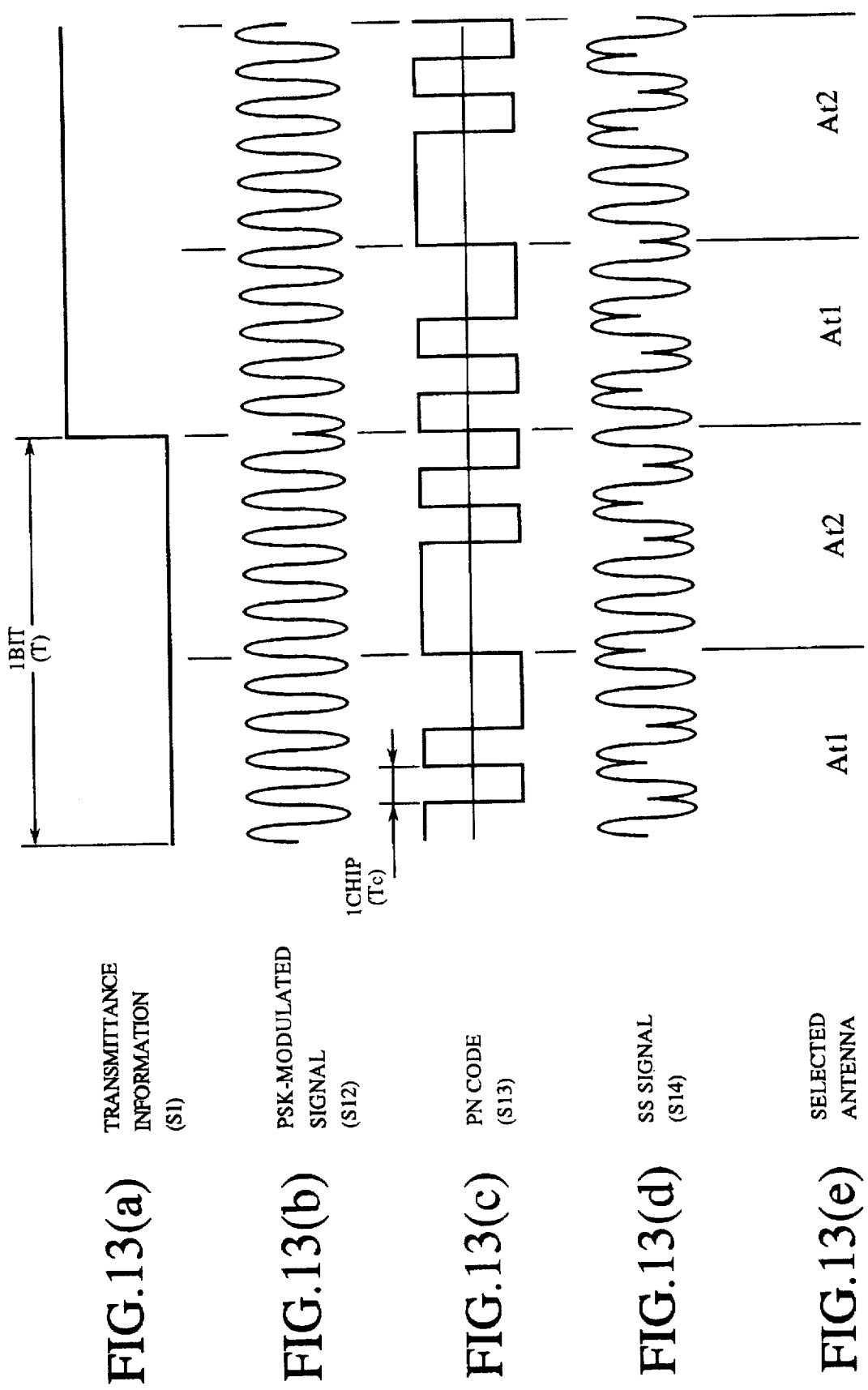
FIG. 13 comprising
Figure 14:
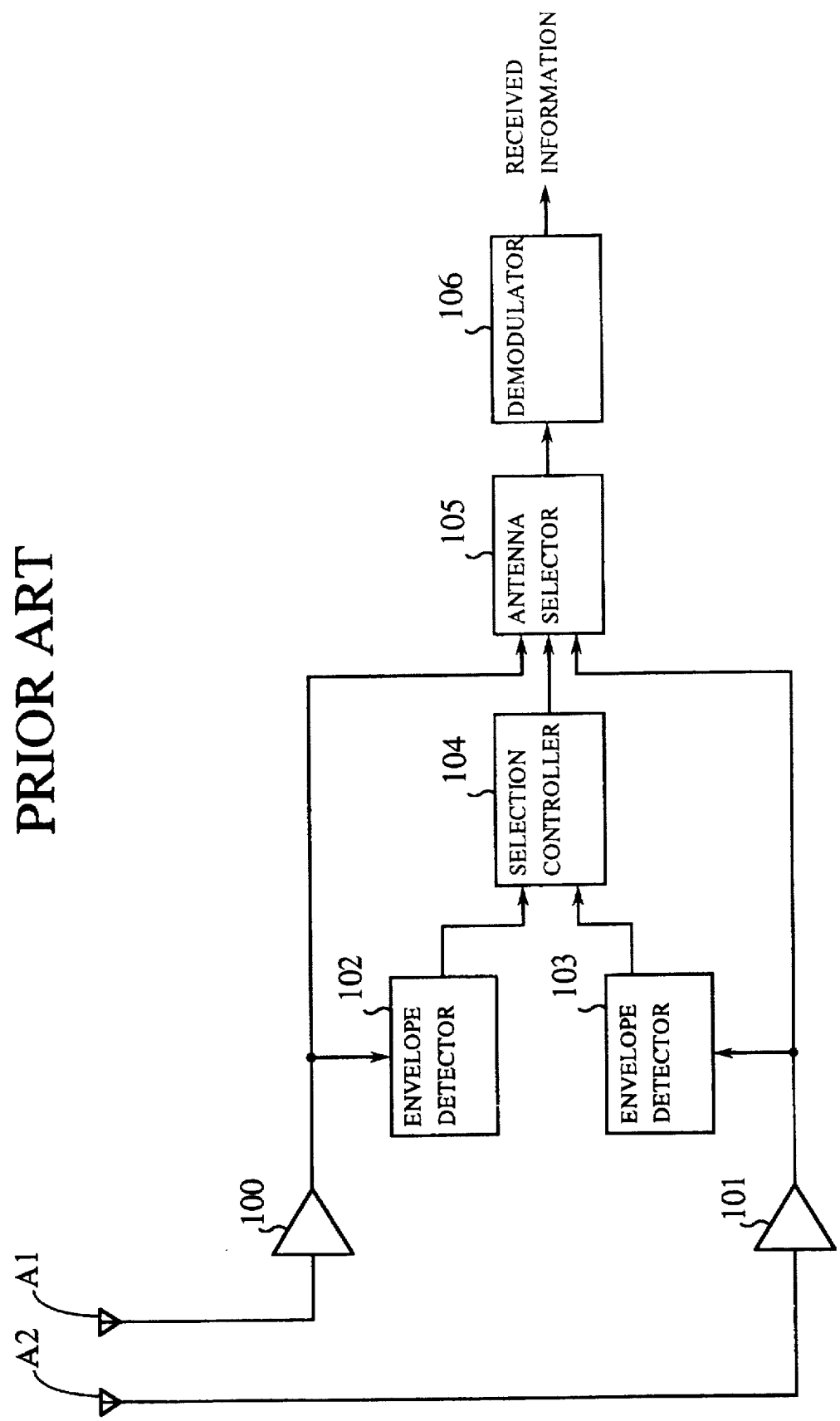
FIG. 14 is a block diagram showing a prior-art receiver operative through selection diversity techniques.

The Base station Te is shown in FIG. 12 as comprising a PN code generator 90 for generating PN code represented by a binary code and shown in FIG. 13(c), an oscillator 91 for generating a propagation signal having a stable frequency which is for example 2.4 MHz, a phase modulator 92 for multiplying the output signal of the parallel-serial converter 2 and the propagation signal generated by the oscillator 91 to produce a PSK-modulated signal shown in FIG. 13(b), and a phase demodulator 93 for multiplying the output signal of the despread demodulator 11 and the propagation signal generated by the oscillator 91 to produce a spread spectrum signal shown in FIG. 13(d). The control unit 4 is operated to instruct the PN code generator 90 to generate the PN code simultaneously when the modulated signal is outputted from the phase modulator 92. The transmittance information signal shown in FIG. 13(a) is, thus, modulated through the PSK by the phase modulator 92 and spread-modulated by the spread modulator 3. As a result, the transmittance information signal is considered to be modulated twice through the PSK and, for this reason, the produced spread spectrum signal has a considerably broad bandwidth in comparison with the transmittance information signal.

As shown in FIG. 13(c), the PN code has a plurality of the chips per one bit of the information signal. The produced spread spectrum signal is supplied from the spread modulator 3 to the transmitting amplifier 7 and amplified by the transmitting amplifier 7 to the extent of a signal level required by the SS communication system. The amplified spread spectrum signal is fed to one of the first and second antennas At1 and At2 through the circulator CIRt and the antenna selector 8. The control unit 4 is operated to instruct the antenna selector 8 to change the selection from the first and second antennas At1 and At2 simultaneously when one chip of the PN code is generated by the PN code generator 90 as shown in FIGS. 13(c) and 13(d). The mobile station Ie is also equipped with a PN code generator 95 capable of generating a PN code identical with that generated by the PN code generator 100, an oscillator 96 for generating a propagation signal having a stable frequency identical with that generated by the oscillator 91, a phase modulator 97 for multiplying the reply information signal generated by the control unit 33 and the propagation signal generated by the oscillator 96, and a phase demodulator 98 for multiplying the output signal of the despread demodulator 31 and the propagation signal generated by the oscillator 96. The SS communication system operative through the DS-SS techniques has the same advantages as that operative through the FS-SS techniques.

The DS-SS techniques may be applied to the second embodiment of the SS communication system shown in FIG. 5. If the PN code is of 13 MHz, the delay time t0 to be fed to the delay circuit 40 may be a time corresponding to duration of two chips, or 159 nsec. In case that the delay time t0 is thus determined, the mobile station Ie can receive the spread spectrum signal from the base station Te without the influence of the fading effect.

Furthermore, the DS-SS techniques may be applied to the fourth embodiment of the SS communication system shown in FIG. 7. Whenever the chip of the PN code is generated by the PN code generator, the control unit 4 informs the first and second phase shifters 60 and 61 of the chip number corresponding to the generated chip. The first and second phase shifters 60 and 61 previously has shift amounts corresponding to the chip numbers, respectively. The first and second phase shifters 61 and 62 is operated to shift the passing spread spectrum signal by the predetermined shift amounts corresponding to the chip numbers received from the control unit 4. The spread spectrum signals emitted from the first and second antennas are varied in interference of waves simultaneously when the chip of the PN code is generated by the PN code generator 90. This means that the antenna unit At is varied in directivity in a simultaneous relationship with the chip of the PN code generated by the PN code generator.

Each of the FH-SS and DS-SS technique is well-known as one of multiple access techniques. It will be apparent that the present invention can be embodied by FH-SS or DS-SS communication system operative through the multiple access techniques. Furthermore, the present invention can be embodied by a so-called hybrid SS communication system.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A method of transmitting information converted to a spread spectrum signal, said information being coded to form an information signal represented by a sequence of bits before being converted to said spread spectrum signal, comprising the steps of:

(a) generating a spreading modulation code;

(b) producing said spread spectrum signal on the basis of said information signal and said spreading modulation code;

(c) having said spread spectrum signal provided with a signal propagation character and transmitting said spread spectrum signal;

(d) varying the signal propagation character of said spread spectrum signal while said spread spectrum signal is transmitted; and (e) repeating said step (d) at least one time during the duration of each bit of said information signal.

2. A method as set forth in claim 1, in which said spreading modulation code generated in said step (a) is represented by a sequence of chips, said step (d) being repeated simultaneously when each of the chips of said spreading modulation code is generated in said step (a).

3. A method as set forth in claim 2, in which the number of the chips existing during duration of one bit of said information signal is three or more.

4. A method as set forth in claim 1, in which said spreading modulation code generated in said step (a) is represented by a sequence of chips, the chips of said spreading modulation code being divided into a plurality of chip groups each including continuous chips, the chip groups of said spreading modulation code being equal in chip number to one another, and said step (d) being repeated simultaneously when each of the chip groups of said spreading modulation code is transmitted.

5. A method as set forth in claim 1, in which said step (c) comprises the step of emitting said spread spectrum signal from a signal emission position, said step (d) comprising the step of varying the signal emission position of said spread spectrum signal.

6. A method as set forth in claim 1, in which said step (c) comprises the step of emitting said spread spectrum signal in the form of a polarized propagation wave, said step (d) comprising the step of varying said polarized propagation wave in aspect of polarization plane.

7. A method as set forth in claim 1, in which said step (c) comprises the step of emitting said spread spectrum signal in the form of a polarized propagation wave, said step (d) comprising the step of varying said polarized propagation wave in rotational direction of polarization plane.

8. A method as set forth in claim 1, in which said step (c) comprises the step of emitting said spread spectrum signal in the form of a propagation wave group having a plurality of propagation waves, said step (d) comprising the step of varying said propagation wave group in interference of waves.

9. A method as set forth in claim 1, further comprising the step of preparing a transmittance antenna having a variable directivity, said step (d) comprising the step of varying the directivity of said transmittance antenna.

10. An apparatus for transmitting information converted to a spread spectrum signal, said information being coded to form an information signal represented by a sequence of bits before being converted to said spread spectrum signal, comprising:

code generating means for generating a spreading modulation code;

signal producing means for producing a spread spectrum signal on the basis of said information signal and said spreading modulation code;

signal transmitting means for having said spread spectrum signal provided with a signal propagation character and transmitting said spread spectrum signal; and character varying means for varying the signal propagation character of said spread spectrum signal while said spread spectrum signal is transmitted by said signal transmitting means, said character varying means operating to vary the signal propagation character of said spread spectrum signal at least one time during the duration of each bit of said information signal.

11. An apparatus as set forth in claim 10, in which said spreading modulation code generated by said code generating means is represented by a sequence of chips, said character varying means being operated to repeatedly vary the signal propagation character of said spread spectrum signal simultaneously when each of the chips of said spreading modulation code is generated by said code generating means.

12. An apparatus as set forth in claim 11, in which the number of the chips existing during duration of one bit of said information signal is three or more.

13. An apparatus as set forth in claim 10, in which said spreading modulation code generated by said code generating means is represented by a sequence of chips, the chips of said spreading modulation code being divided into a plurality of chip groups each including continuous chips, the chip groups of said spreading modulation code being equal in chip number to one another, and said character varying means being operated to repeatedly vary the signal propagation character of said spread spectrum signal simultaneously when each of the chip groups of said spreading modulation code is transmitted.

14. An apparatus as set forth in claim 10, in which said signal transmitting means comprises a plurality of transmittance antennas spatially uncorrelated with one another, said spread spectrum signal being emitted from one of said transmittance antennas and having a signal emission position defined by said one of said transmittance antennas, and said character varying means being operated to vary the signal emission position of said spread spectrum signal between said transmittance antennas while said spread spectrum signal is transmitted by said signal transmitting means.

15. An apparatus as set forth in claim 10, in which said signal transmitting means comprises a plurality of transmittance antennas different in directivity from one another, said spread spectrum signal being emitted from one of said transmittance antennas and having a signal emission position defined by said one of said transmittance antennas, and said character varying means being operated to vary the signal emission position of said spread spectrum signal between said transmittance antennas while said spread spectrum signal is transmitted by said signal transmitting means.

16. An apparatus as set forth in claim 10, in which said signal transmitting means comprises a transmittance antenna unit having a variable directivity, said spread spectrum signal being emitted from said transmittance antenna unit, and said character varying means being operated to vary the directivity of said transmittance antenna unit while said spread spectrum signal is transmitted by said signal transmitting means.

17. A method as set forth in claim 16, in which said spreading modulation code generated by said code generating means is represented by a sequence of chips, said transmittance antenna unit being a phased array antenna, and said character varying means being operated to vary the directivity of said phased array antenna simultaneously when each of the chips of said spreading modulation code is generated by said code generating means.

18. An apparatus as set forth in claim 10, in which said signal transmitting means comprises a transmittance antenna unit and is operated to emit said spread spectrum signal from said transmittance antenna unit in the form of a polarized propagation wave having a variable polarization plane, said character varying means being operated to vary the polarized propagation wave in aspect of polarization plane while said spread spectrum signal is transmitted by said signal transmitting means.

19. An apparatus as set forth in claim 10, in which said transmitting means comprises a transmittance antenna unit and is operated to emit said spread spectrum signal from said transmittance antenna unit in the form of a polarized propagation wave having a rotatable polarization plane, said character varying means being operated to vary the polarized propagation wave in rotational direction of polarization plane while said spread spectrum signal is transmitted by said signal transmitting means.

20. An apparatus as set forth in claim 10, in which said transmitting means comprises a transmittance antenna unit and is operated to emit said spread spectrum signal from said transmittance antenna unit in the form of a plurality of propagation waves as a whole variable in interference of waves, said character varying means being operated to vary said propagation waves as a whole in interference of waves while said spread spectrum signal is transmitted by said signal transmitting means.

21. An apparatus as set forth in claim 20, in which said transmittance antenna unit has a plurality of antennas spatially correlated with one another and having said spread spectrum signal emitted therefrom in the form of said propagation waves, respectively, said character varying means comprising a delay circuit provided between said signal producing means and said transmittance antenna unit for partially delaying the passing spread spectrum signals to be supplied to the antennas of said transmittance antenna unit, thereby varying said propagation waves as a whole in interference of waves.

22. An apparatus as set forth in claim 10, in which said spreading modulation code is defined by a pattern of frequency hopping, said spread spectrum signal being a frequency hopping spread spectrum signal having a plurality of frequency components, said signal transmitting means comprising a plurality of transmittance antennas spatially uncorrelated with one another, said spread spectrum signal being emitted from one of said transmittance antennas having a signal emission position defined by said one of said transmittance antennas, said character varying means comprising a plurality of frequency filters each provided between said signal producing means and each of said transmittance antennas for filtering the passing spread spectrum signals in accordance with the frequency components of said spread spectrum signal, thereby varying the signal emission position of said spread spectrum signal.

23. An apparatus as set forth in claim 10, in which said spreading modulation code is defined by a pattern of frequency hopping, said spread spectrum signal being a frequency hopping spread spectrum signal having a plurality of frequency components, said transmitting means comprising a plurality of transmittance antennas spatially correlated with one another, said spread spectrum signal being emitted from said transmittance antennas in the form of propagation waves, respectively, and said character varying means comprising:

phase shifters each provided between said signal producing means and each of said transmittance antennas for shifting phases of the passing spread spectrum signals, respectively; and a control unit for controlling said phase shifters in accordance with the frequency components of said spread spectrum signal to cause said transmittance antennas to receive the spread spectrum signals, respectively, which are different in phase from one another, thereby varying said propagation waves as a whole in interference of waves.

24. An apparatus as set forth in claim 10, in which said spreading modulation code is defined by a pattern of frequency hopping, said spread spectrum signal being a frequency hopping spread spectrum signal having a plurality of frequency components, said signal transmitting means comprising an array antenna having a plurality of antenna elements, said spread signal being emitted from the antenna elements of said array antenna in the form of propagation waves, respectively, and said character varying means comprising:

phase shifters each provided between said signal producing means and each of the antenna elements of said array antenna for shifting phases of the passing spread spectrum signals, respectively; and a control unit for controlling said phase shifters in accordance with the frequency components of said spread spectrum signal to cause the antenna elements of said array antenna to receive the spread spectrum signals, respectively, which are different in phase from one another, thereby varying said propagation waves as a whole in interference of waves.

25. An apparatus as set forth in claim 10, in which said spreading modulation code is defined by a pattern of frequency hopping, said spread spectrum signal being a frequency hopping spread spectrum signal having a plurality of frequency components, said transmitting means comprising a plurality of array antennas each having a plurality of antenna elements, said spread spectrum signal being emitted from said array antennas, and said character varying means comprising a microstrip line provided between said signal producing means and said array antennas for partially restricting the passing spread spectrum signals in accordance with the frequency components of said spread spectrum signal, thereby emitting said spread spectrum signal from a signal emission position and varying a signal emission position of the spread spectrum signal in appearance.

26. An apparatus as set forth in claim 10, in which said spreading modulation code is defined by a pattern of frequency hopping, said spread spectrum signal have a plurality of frequency components, said signal transmitting means comprising an array antenna having a plurality of antenna elements, said spread spectrum signal being emitted from said array antenna, and said character varying means comprising a microstrip line provided between said signal producing means and said array antenna for partially restricting the passing spread spectrum signals in accordance with the frequency components of said spread spectrum signal, thereby emitting said spread spectrum signal from a signal emission position and varying a signal emission position of said spread spectrum signal in appearance.

27. An apparatus as set forth in claim 10, in which said spreading modulation code is defined by a pattern of frequency hopping, said spread spectrum signal being a frequency hopping spread spectrum signal having a plurality of frequency components, said transmitting means comprising a helical antenna having a variable directivity, said spread spectrum signal being emitted from said helical antenna, and said character changing means being operated to vary the directivity of said helical antenna in accordance with the frequency components of said spread spectrum signal.

28. An apparatus for transmitting information converted to a frequency hopping spread spectrum signal having a plurality of frequency components, said information being coded to form a information signal represented by a sequence of bits before being converted to said frequency hopping spread spectrum signal, comprising:

pattern generating means for generating a pattern of frequency hopping;

signal producing means for producing said frequency hopping spread spectrum signal on the basis of said information signal and said pattern of frequency hopping; and signal transmitting means for having said frequency hopping spread spectrum signal provided with a signal propagation character and transmitting said frequency hopping spread spectrum signal, said signal transmitting means operating to vary the signal propagation character of said frequency hopping spread spectrum signal in accordance with said pattern of frequency hopping.

29. An apparatus as set forth in claim 28, in which said signal transmitting means comprises a plurality of transmittance antennas having different lengths corresponding to the frequency components of said frequency hopping spread spectrum signal, respectively, the frequency components of said frequency hopping spread spectrum signal being emitted from said transmittance antennas, respectively, to cause a signal emission position of said frequency hopping spread spectrum signal to be varied, thereby varying the signal propagation character of said frequency hopping spread spectrum signal.

30. An apparatus as set forth in claim 28, in which said signal transmitting means comprises an array antenna having a plurality of antenna elements having different antenna lengths corresponding to the frequency components of said frequency hopping spread spectrum signals, respectively, the frequency components of said frequency hopping spread spectrum signal being emitted from the antenna elements of said array antenna, respectively, to cause a signal emission position of said frequency hopping spread spectrum signal to be varied, thereby varying the signal propagation character of said frequency hopping spread spectrum signal.

* * * * *